US010810992B2

(12) United States Patent
Audfray et al.

(10) Patent No.: US 10,810,992 B2
(45) Date of Patent: Oct. 20, 2020

(54) REVERBERATION GAIN NORMALIZATION

(71) Applicant: Magic Leap, Inc., Plantation, FL (US)

(72) Inventors: Remi Samuel Audfray, San Francisco, CA (US); Jean-Marc Jot, Aptos, CA (US); Samuel Charles Dicker, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/442,359

(22) Filed: Jun. 14, 2019

(65) Prior Publication Data

US 2019/0385587 A1 Dec. 19, 2019

Related U.S. Application Data

(60) Provisional application No. 62/685,235, filed on Jun. 14, 2018.

(51) Int. Cl.
*G10K 15/08* (2006.01)
*H04B 3/20* (2006.01)
*G10H 1/16* (2006.01)

(52) U.S. Cl.
CPC .................................... *G10K 15/08* (2013.01)

(58) Field of Classification Search
CPC ........... H04S 7/305; H04S 5/00; G10K 15/08; G10H 2210/281; G01H 7/00
USPC ............................................... 381/61, 63, 66
See application file for complete search history.

(56) References Cited

U.S. PATENT DOCUMENTS

| | | | |
|---|---|---|---|
| 5,555,306 A * | 9/1996 | Gerzon .................. | G10K 15/12 381/63 |
| 2007/0195967 A1 | 8/2007 | Wu | |
| 2014/0003630 A1 | 1/2014 | Demiya | |
| 2015/0379980 A1 | 12/2015 | Neugebauer | |
| 2017/0126194 A1 | 5/2017 | Jot | |
| 2017/0223478 A1 | 8/2017 | Jot et al. | |

OTHER PUBLICATIONS

International Search Report dated Sep. 13, 2019, for PCT Application No. PCT/US19/37384, filed Jun. 14, 2019, three pages.

* cited by examiner

*Primary Examiner* — George C Monikang
(74) *Attorney, Agent, or Firm* — Morrison & Foerster LLP

(57) ABSTRACT

Systems and methods for providing accurate and independent control of reverberation properties are disclosed. In some embodiments, a system may include a reverberation processing system, a direct processing system, and a combiner. The reverberation processing system can include a reverb initial power (RIP) control system and a reverberator. The RIP control system can include a reverb initial gain (RIG) and a RIP corrector. The RIG can be configured to apply a RIG value to the input signal, and the RIP corrector can be configured to apply a RIP correction factor to the signal from the RIG. The reverberator can be configured to apply reverberation effects to the signal from the RIP control system. In some embodiments, one or more values and/or correction factors can be calculated and applied such that the signal output from a component in the reverberation processing system is normalized to a predetermined value (e.g., unity (1.0)).

22 Claims, 24 Drawing Sheets

REVERBERATION GAIN NORMALIZATION

REFERENCE TO RELATED APPLICATIONS

This application claims benefit of U.S. Provisional Patent Application No. 62/685,235, filed on Jun. 14, 2018, which is hereby incorporated by reference in its entirety.

FIELD

This disclosure relates in general to reverberation algorithms and reverberators for using the disclosed reverberation algorithms. More specifically, this disclosure relates to calculating a reverberation initial power (RIP) correction factor and applying it in series with a reverberator. This disclosure also relates to calculating a reverberation energy correction (REC) factor and applying it in series with a reverberator.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. Such systems can offer a uniquely heightened sense of immersion and realism by combining virtual visual and audio cues with real sights and sounds. Accordingly, it can be desirable to present digital sounds to a user of an XR system in such a way that the sounds seem to be occurring—naturally, and consistently with the user's expectations of the sound—in the user's real environment. Generally speaking, users expect that virtual sounds will take on the acoustic properties of the real environment in which they are heard. For instance, a user of an XR system in a large concert hall will expect the virtual sounds of the XR system to have large, cavernous sonic qualities; conversely, a user in a small apartment will expect the sounds to be more dampened, close, and immediate.

Digital, or artificial, reverberators may be used in audio and music signal processing to simulate perceived effects of diffuse acoustic reverberation in rooms. A system that provides accurate and independent control of reverberation loudness and reverberation decay for each digital reverberator, for example, for intuitive control for sound designers may be desired.

BRIEF SUMMARY

Systems and methods for providing accurate and independent control of reverberation properties are disclosed. In some embodiments, a system may include a reverberation processing system, a direct processing system, and a combiner. The reverberation processing system can include a reverb initial power (RIP) control system and a reverberator. The RIP control system can include a reverb initial gain (RIG) and a RIP corrector. The RIG can be configured to apply a RIG value to the input signal, and the RIP corrector can be configured to apply a RIP correction factor to the signal from the RIG. The reverberator can be configured to apply reverberation effects to the signal from the RIP control system.

In some embodiments, the reverberator can include one or more comb filters to filter out one or more frequencies in the system. The one or more frequencies can be filtered out to mimic environmental effects, for example. In some embodiments, the reverberator can include one or more all-pass filters. Each all-pass filter can receive a signal from the comb filters and can be configured to pass its input signal without changing its magnitude, but can change a phase of the signal.

In some embodiments, the RIG can include a reverb gain (RG) configured to apply a RG value to the input signal. In some embodiments, the RIG can include a REC configured to apply a RE correction factor to the signal from the RG.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Example Wearable System

Figure 1:
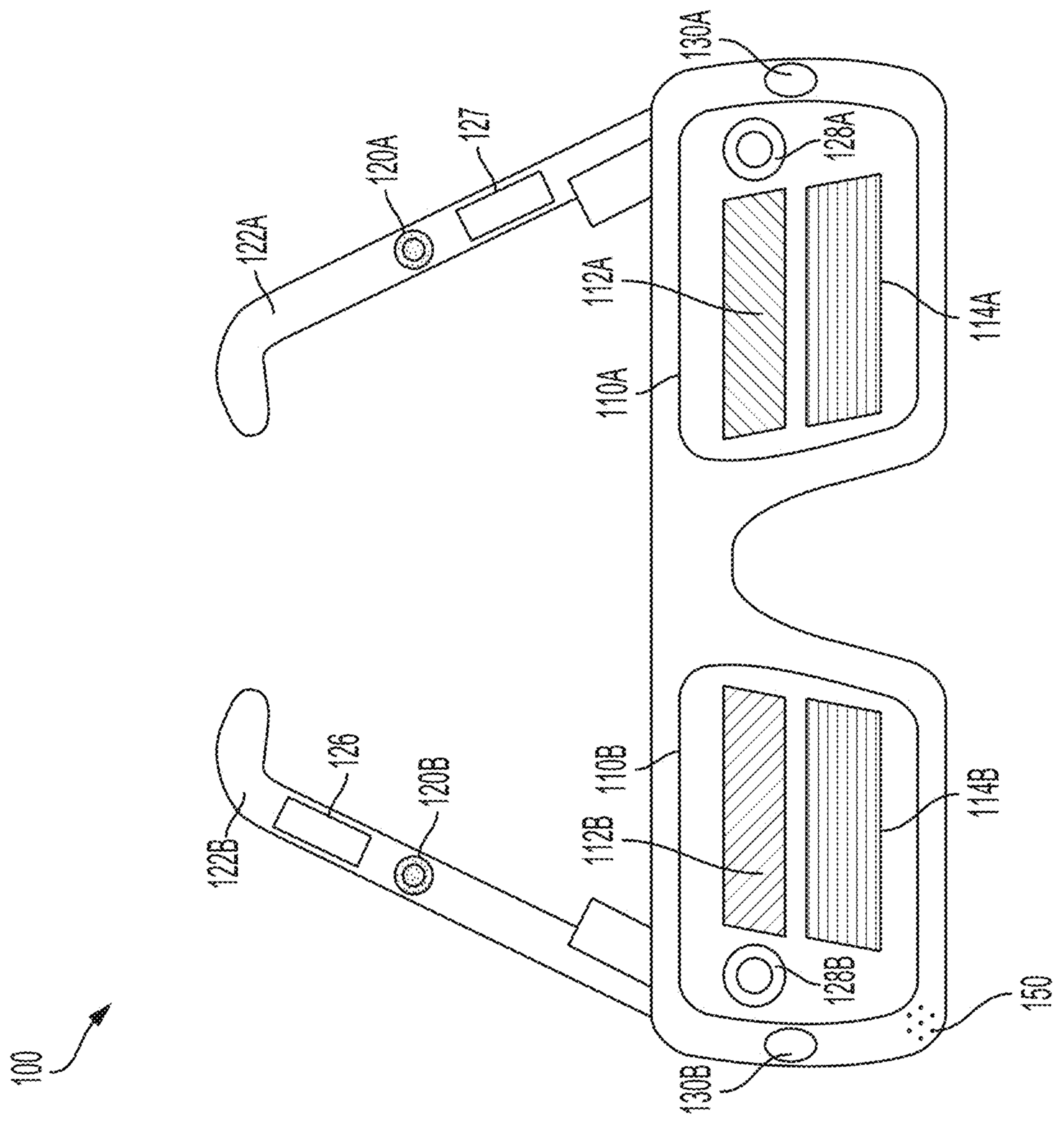
FIG. 1 illustrates an example wearable system, according to some embodiments.

FIG. 1 illustrates an example wearable head device 100 configured to be worn on the head of a user. Wearable head device 100 may be part of a broader wearable system that comprises one or more components, such as a head device (e.g., wearable head device 100), a handheld controller (e.g., handheld controller 200 described below), and/or an auxiliary unit (e.g., auxiliary unit 300 described below). In some examples, wearable head device 100 can be used for virtual reality, augmented reality, or mixed reality systems or applications. Wearable head device 100 can comprise one or more displays, such as displays 110A and 110B (which may comprise left and right transmissive displays, and associated components for coupling light from the displays to the user's eyes, such as orthogonal pupil expansion (OPE) grating sets 112A/112B and exit pupil expansion (EPE) grating sets 114A/114B); left and right acoustic structures, such as speakers 120A and 120B (which may be mounted on temple arms 122A and 122B, and positioned adjacent to the user's left and right ears, respectively); one or more sensors such as infrared sensors, accelerometers, GPS units, inertial measurement units (IMU)(e.g. IMU 126), acoustic sensors (e.g., microphone 150); orthogonal coil electromagnetic receivers (e.g., receiver 127 shown mounted to the left temple arm 122A); left and right cameras (e.g., depth (time-of-flight) cameras 130A and 130B) oriented away from the user; and left and right eye cameras oriented toward the user (e.g., for detecting the user's eye movements)(e.g., eye cameras 128 and 128B). However, wearable head device 100 can incorporate any suitable display technology, and any suitable number, type, or combination of sensors or other components without departing from the scope of the invention. In some examples, wearable head device 100 may incorporate one or more microphones 150 configured to detect audio signals generated by the user's voice; such microphones may be positioned in a wearable head device adjacent to the user's mouth. In some examples, wearable head device 100 may incorporate networking features (e.g., Wi-Fi capability) to communicate with other devices and systems, including other wearable systems. Wearable head device 100 may further include components such as a battery, a processor, a memory, a storage unit, or various input devices (e.g., buttons, touchpads); or may be coupled to a handheld controller (e.g., handheld controller 200) or an auxiliary unit (e.g., auxiliary unit 300) that comprises one or more such components. In some examples, sensors may be configured to output a set of coordinates of the head-mounted unit relative to the user's environment, and may provide input to a processor performing a Simultaneous Localization and Mapping (SLAM) procedure and/or a visual odometry algorithm. In some examples, wearable head device 100 may be coupled to a handheld controller 200, and/or an auxiliary unit 300, as described further below.

Figure 2:
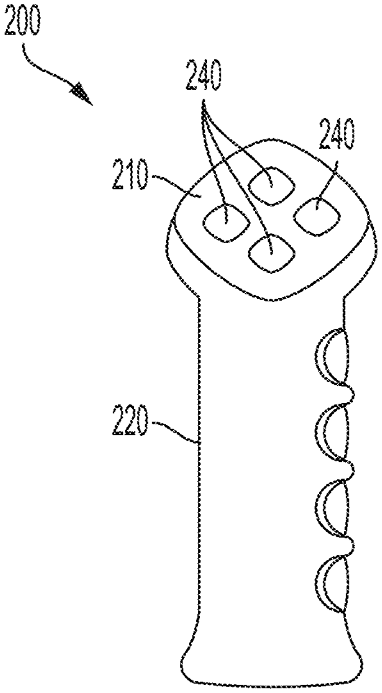
FIG. 2 illustrates an example handheld controller that can be used in conjunction with an example wearable system, according to some embodiments.

FIG. 2 illustrates an example mobile handheld controller component 200 of an example wearable system. In some examples, handheld controller 200 may be in wired or wireless communication with wearable head device 100 and/or auxiliary unit 300 described below. In some examples, handheld controller 200 includes a handle portion 220 to be held by a user, and one or more buttons 240 disposed along a top surface 210. In some examples, handheld controller 200 may be configured for use as an optical tracking target; for example, a sensor (e.g., a camera or other optical sensor) of wearable head device 100 can be configured to detect a position and/or orientation of handheld controller 200—which may, by extension, indicate a position and/or orientation of the hand of a user holding handheld controller 200. In some examples, handheld controller 200 may include a processor, a memory, a storage unit, a display, or one or more input devices, such as described above. In some examples, handheld controller 200 includes one or more sensors (e.g., any of the sensors or tracking components described above with respect to wearable head device 100). In some examples, sensors can detect a position or orientation of handheld controller 200 relative to wearable head device 100 or to another component of a wearable system. In some examples, sensors may be positioned in handle portion 220 of handheld controller 200, and/or may be mechanically coupled to the handheld controller. Handheld controller 200 can be configured to provide one or more output signals, corresponding, for example, to a pressed state of the buttons 240; or a position, orientation, and/or motion of the handheld controller 200 (e.g., via an IMU). Such output signals may be used as input to a processor of wearable head device 100, to auxiliary unit 300, or to another component of a wearable system. In some examples, handheld controller 200 can include one or more microphones to detect sounds (e.g., a user's speech, environmental sounds), and in some cases provide a signal corresponding to the detected sound to a processor (e.g., a processor of wearable head device 100).

Figure 3:
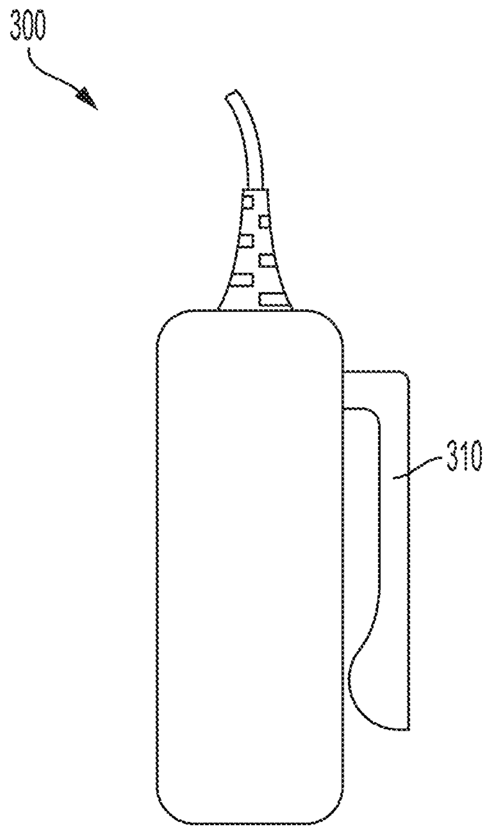
FIG. 3 illustrates an example auxiliary unit that can be used in conjunction with an example wearable system, according to some embodiments.

FIG. 3 illustrates an example auxiliary unit 300 of an example wearable system. In some examples, auxiliary unit 300 may be in wired or wireless communication with wearable head device 100 and/or handheld controller 200. The auxiliary unit 300 can include a battery to provide energy to operate one or more components of a wearable system, such as wearable head device 100 and/or handheld controller 200 (including displays, sensors, acoustic structures, processors, microphones, and/or other components of wearable head device 100 or handheld controller 200). In some examples, auxiliary unit 300 may include a processor, a memory, a storage unit, a display, one or more input devices, and/or one or more sensors, such as described above. In some examples, auxiliary unit 300 includes a clip 310 for attaching the auxiliary unit to a user (e.g., a belt worn by the user). An advantage of using auxiliary unit 300 to house one or more components of a wearable system is that doing so may allow large or heavy components to be carried on a user's waist, chest, or back—which are relatively well-suited to support large and heavy objects—rather than mounted to the user's head (e.g., if housed in wearable head device 100) or carried by the user's hand (e.g., if housed in handheld controller 200). This may be particularly advantageous for relatively heavy or bulky components, such as batteries.

Figure 4:
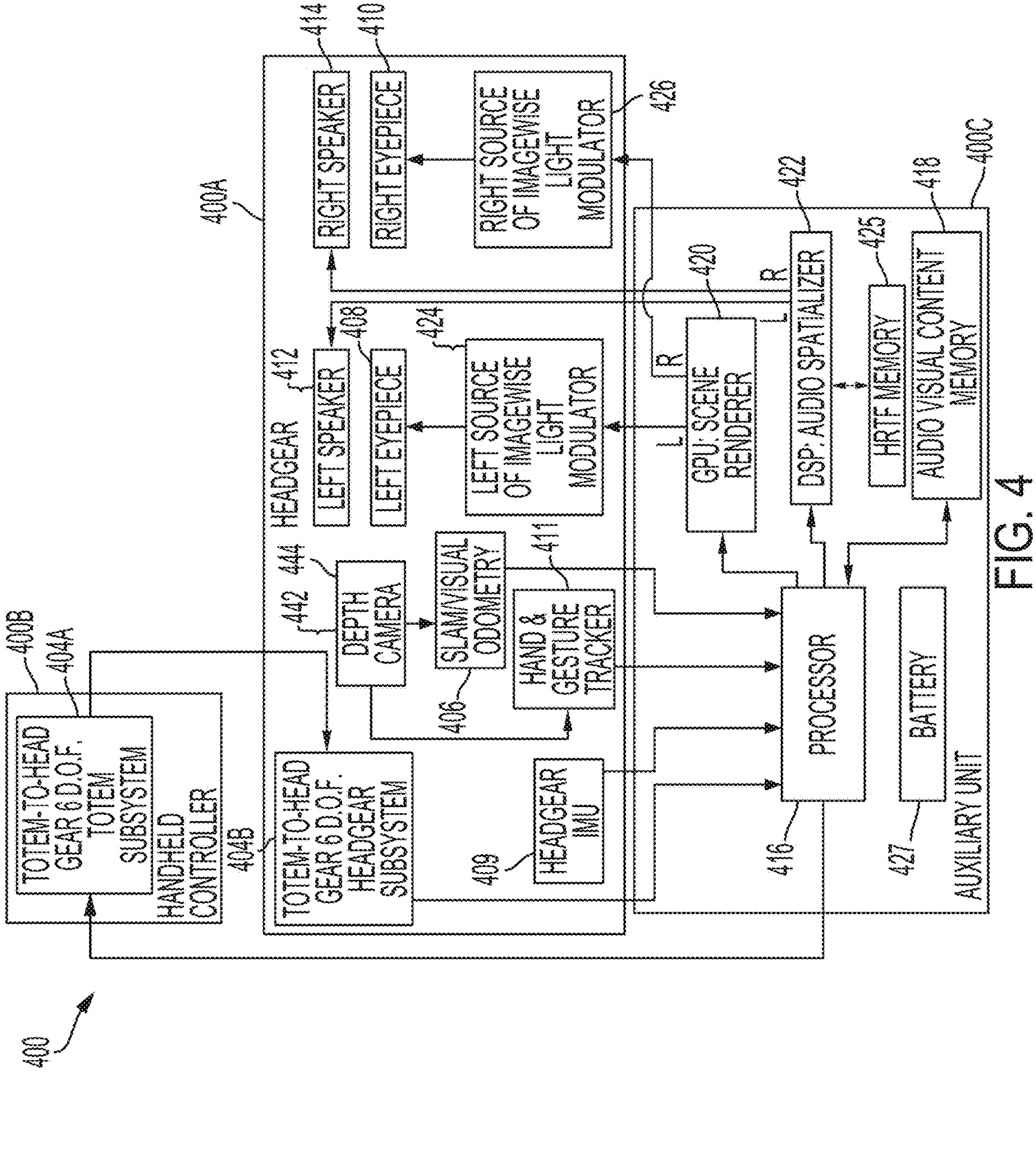
FIG. 4 illustrates an example functional block diagram for an example wearable system, according to some embodiments.

FIG. 4 shows an example functional block diagram that may correspond to an example wearable system 400, such as may include example wearable head device 100, handheld controller 200, and auxiliary unit 300 described above. In some examples, the wearable system 400 could be used for virtual reality, augmented reality, or mixed reality applications. As shown in FIG. 4, wearable system 400 can include example handheld controller 400B, referred to here as a "totem" (and which may correspond to handheld controller 200 described above); the handheld controller 400B can include a totem-to-headgear six degree of freedom (6DOF) totem subsystem 404A. Wearable system 400 can also include example wearable head device 400A (which may correspond to wearable headgear device 100 described above); the wearable head device 400A includes a totem-to-headgear 6DOF headgear subsystem 404B. In the example, the 6DOF totem subsystem 404A and the 6DOF headgear subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch, and roll rotations; as vectors; as a rotation matrix; as a quaternion; or as some other representation. In some examples, one or more depth cameras 444 (and/or one or more non-depth cameras) included in the wearable head device 400A; and/or one or more optical targets (e.g., buttons 240 of handheld controller 200 as described above, or dedicated optical targets included in the handheld controller) can be used for 6DOF tracking. In some examples, the handheld controller 400B can include a camera, as described above; and the headgear 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the handheld controller 400B relative to the wearable head device 400A may be determined. In some examples, 6DOF totem subsystem 404A can include an Inertial Measurement Unit (IMU) that is useful to provide improved accuracy and/or more timely information on rapid movements of the handheld controller 400B.

In some examples involving augmented reality or mixed reality applications, it may be desirable to transform coordinates from a local coordinate space (e.g., a coordinate space fixed relative to wearable head device 400A) to an inertial coordinate space, or to an environmental coordinate space. For instance, such transformations may be necessary for a display of wearable head device 400A to present a virtual object at an expected position and orientation relative to the real environment (e.g., a virtual person sitting in a real chair, facing forward, regardless of the position and orientation of wearable head device 400A), rather than at a fixed position and orientation on the display (e.g., at the same position in the display of wearable head device 400A). This can maintain an illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 (e.g., using a Simultaneous Localization and Mapping (SLAM) and/or visual odometry procedure) in order to determine the transformation of the wearable head device 400A relative to an inertial or environmental coordinate system. In the example shown in FIG. 4, the depth cameras 444 can be coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and a real coordinate space. Similarly, in some examples, an additional source of information on the user's head pose and location is obtained from an IMU 409 of wearable head device 400A. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of wearable head device 400A. The hand gesture tracker 411 can identify a user's hand gestures, for example, by matching 3D imagery received from the depth cameras 444 to stored patterns representing hand gestures. Other suitable techniques of identifying a user's hand gestures will be apparent.

In some examples, one or more processors 416 may be configured to receive data from headgear subsystem 404B, the IMU 409, the SLAM/visual odometry block 406, depth cameras 444, a microphone (not shown); and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426. The DSP audio spatializer 422 can output audio to a left speaker 412 and/or a right speaker 414. The DSP audio spatializer 422 can receive input from processor 416 indicating a direction vector from a user to a virtual sound source (which may be moved by the user, e.g., via the handheld controller 400B). Based on the direction vector, the DSP audio spatializer 422 can determine a corresponding HRTF (e.g., by accessing a HRTF, or by interpolating multiple HRTF s). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 300 described above). The auxiliary unit 400C may include a battery 427 to power its components and/or to supply power to wearable head device 400A and/or handheld controller 400B. Including such components in an auxiliary unit, which can be mounted to a user's waist, can limit the size and weight of wearable head device 400A, which can in turn reduce fatigue of a user's head and neck.

While FIG. 4 presents elements corresponding to various components of an example wearable system 400, various other suitable arrangements of these components will become apparent to those skilled in the art. For example, elements presented in FIG. 4 as being associated with auxiliary unit 400C could instead be associated with wearable head device 400A or handheld controller 400B. Furthermore, some wearable systems may forgo entirely a handheld controller 400B or auxiliary unit 400C. Such changes and modifications are to be understood as being included within the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example, in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time, based on data associated with the virtual environment and/or input provided by a user, a state of the virtual environment at a second time. For instance, if an object in the virtual environment is located at a first coordinate at time, and has certain programmed physical parameters (e.g., mass, coefficient of friction); and an input received from user indicates that a force should be applied to the object in a direction vector; the processor can apply laws of kinematics to determine a location of the object at time using basic mechanics. The processor can use any suitable information known about the virtual environment, and/or any suitable input, to determine a state of the virtual environment at a time. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

Reverberation Algorithms and Reverberators

In some embodiments, digital reverberators may be designed based on delay networks with feedback. In such embodiments, reverberator algorithm design guidelines may be included/available for accurate parametric decay time control and for maintaining reverberation loudness when decay time is varied. Relative adjustment of the reverberation loudness may be realized by providing an adjustable signal amplitude gain in cascade with the digital reverberator. This approach may enable a sound designer or a recording engineer to tune reverberation decay time and reverberation loudness independently, while audibly monitoring a reverberator output signal in order to achieve a desired effect.

Programmatic applications, such as interactive audio engines for video games or VR/AR/MR, may simulate multiple moving sound sources at various positions and distances around a listener (e.g., a virtual listener) in a room/environment (e.g., virtual room/environment), relative reverberation loudness control may not be sufficient. In some embodiments, an absolute reverberation loudness is applied that may be experienced from each virtual sound source at rendering time. Many factors may adjust this value, such as, for example, listener and sound source positions, as well as acoustic properties of the room/environment, for example, simulated by a reverberator. In some embodiments, such as in interactive audio applications, it is desirable to programmatically control the reverberation initial power (RIP), for example, as defined in "Analysis and synthesis of room reverberation based on a statistical time-frequency model" by Jean-Marc Jot, Laurent Cerveau, and Olivier Warusfel. The RIP may be used to characterize a virtual room irrespective of positions of a virtual listener or virtual sound sources.

In some embodiments, a reverberation algorithm (executed by a reverberator) may be configured to perceptually match acoustic reverberation properties of a specific room. Example acoustic reverberation properties can include, but are not limited to, reverberation initial power (RIP) and reverberation decay time (T60). In some embodiments, the acoustic reverberation properties of a room may be measured in a real room, calculated by a computer simulation based on geometric and/or physical description of a real room or virtual room, or the like.

Example Audio Rendering System

Figure 5A:
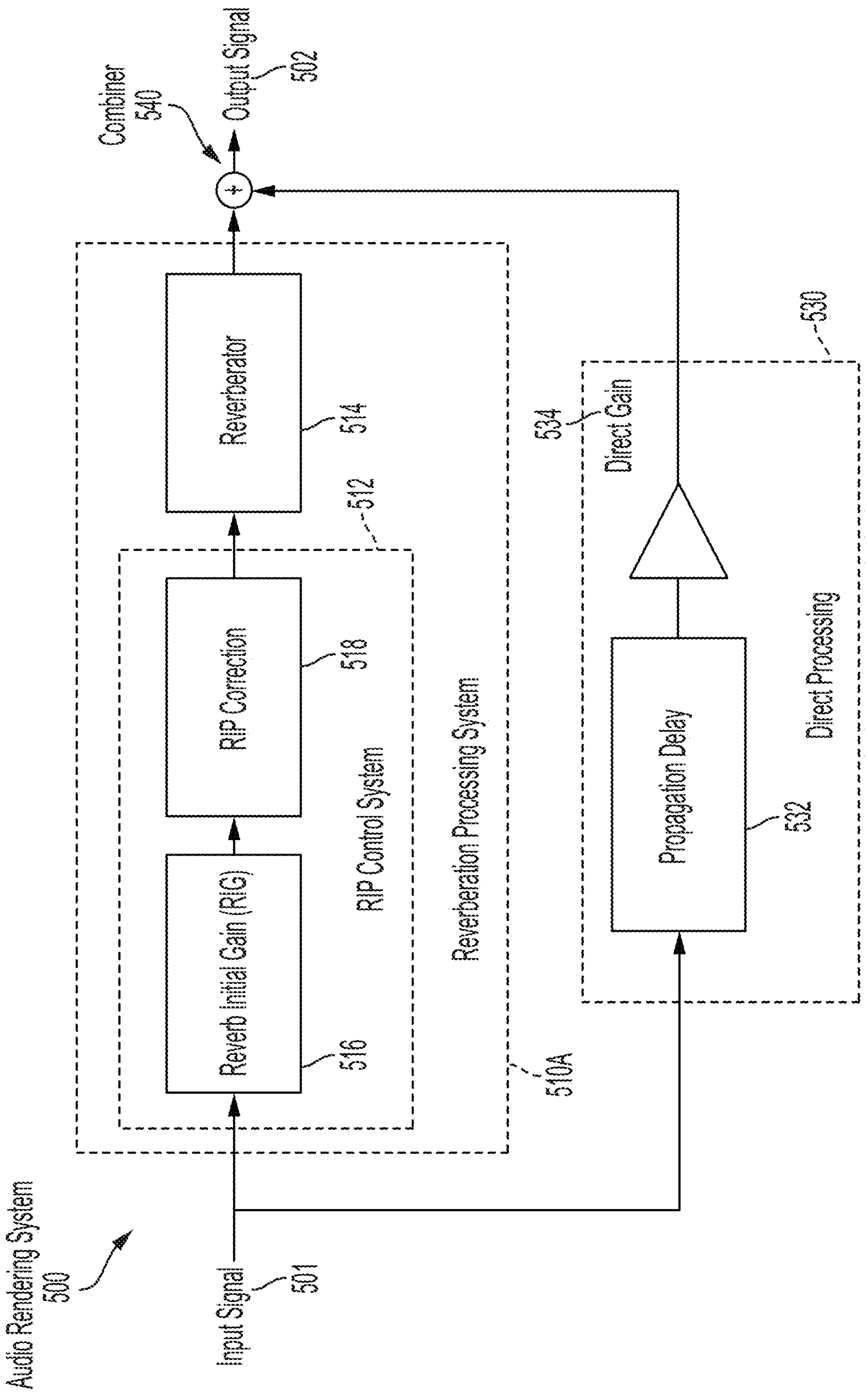
FIG. 5A illustrates a block diagram of an example audio rendering system, according to some embodiments.
Figure 5B:
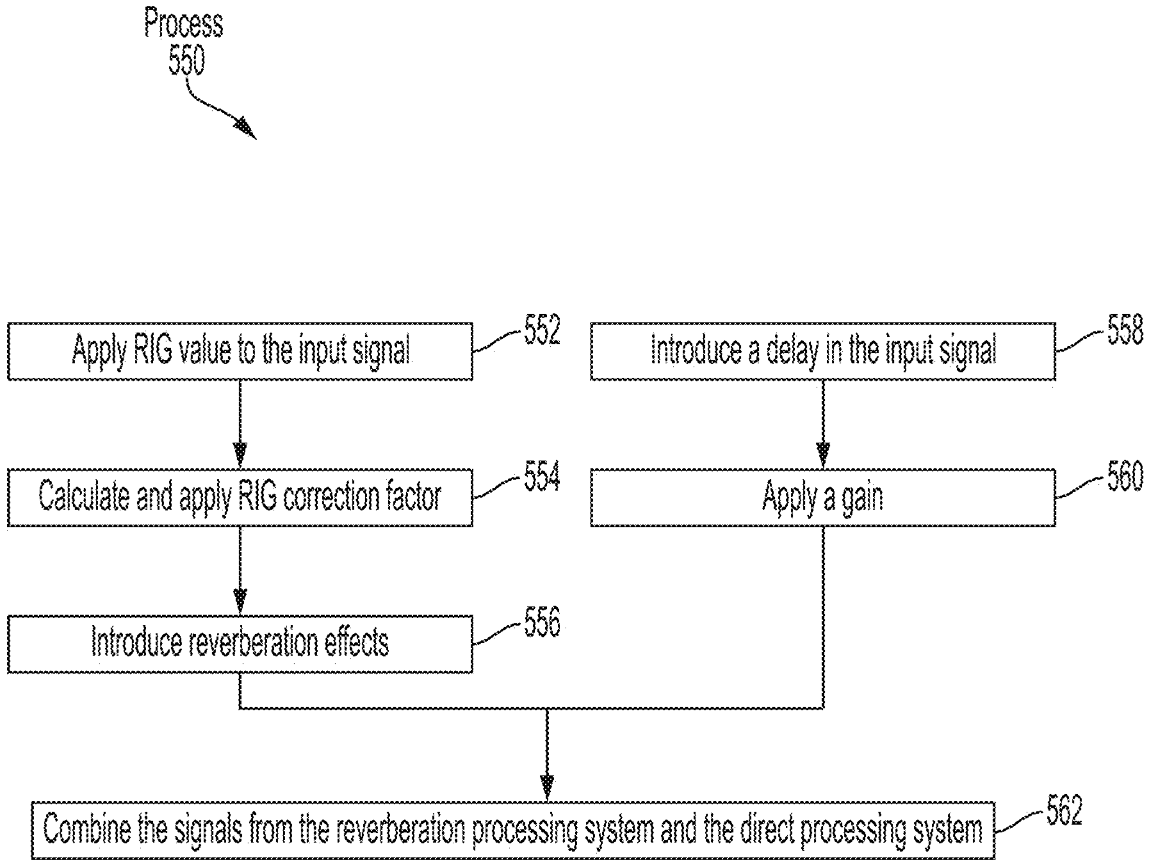
FIG. 5B illustrates a flow of an example process for operating the audio rendering system of FIG. 5A, according to some embodiments.

FIG. 5A illustrates a block diagram of an example audio rendering system, according to some embodiments. FIG. 5B illustrates a flow of an example process for operating the audio rendering system of FIG. 5A, according to some embodiments.

Audio rendering system 500 can include a reverberation processing system 510A, a direct processing system 530, and a combiner 540. Both the reverberation processing system 510A and the direct processing system 530 can receive the input signal 501.

The reverberation processing system 510A can include a RIP control system 512 and a reverberator 514. The RIP control system 512 can receive the input signal 501 and can output a signal to the reverberator 514. The RIP control system 512 can include a reverb initial gain (RIG) 516 and a RIP corrector 518. The RIG 516 can receive the first portion of the input signal 501 and can output a signal to the RIP corrector 518. The RIG 516 can be configured to apply a RIG value to the input signal 501 (step 552 of process 550). Setting the RIG value can have an effect of specifying an absolute amount of RIP in output signal of the reverberation processing system 510A.

The RIP corrector 518 can receive a signal from the RIG 516 and can be configured to calculate and apply a RIP correction factor to its input signal (from the RIG 516) (step 554). The RIP corrector 518 can output a signal to the reverberator 514. The reverberator 514 can receive a signal from the RIP corrector 518 and can be configured to introduce reverberation effects in the signal (step 556). The reverberation effects can be based on the virtual environment, for example. The reverberator 514 is discussed in more detail below.

The direct processing system 530 can include a propagation delay 532 and a direct gain 534. The direct processing system 530 and the propagation delay 532 can receive the second portion of the input signal 501. The propagation delay 532 can be configured to introduce a delay in the input signal 501 (step 558) and can output the delayed signal to the direct gain 534. The direct gain 534 can receive a signal from the propagation delay 532 and can be configured to apply a gain to the signal (step 560).

The combiner 540 can receive the output signals from both the reverberation processing system 510A and the direct processing system 530 and can be configured to combine (e.g., add, aggregate, etc.) the signals (step 562). The output from the combiner 540 can be the output signal 540 of the audio rendering system 500.

Example Reverberation Initial Power (Rip) Normalization

In the reverberation processing system 510A, both the RIG 516 and the RIP corrector 518 can apply (and/or calculate) the RIG value and the RIP correction factor, respectively, such that when applied in series the signal output from the RIP corrector 518 can be normalized to a predetermined value (e.g., unity (1.0)). That is, the RIG value of an output signal can be controlled by applying the RIG 516 in series with the RIP corrector 518. In some embodiments, the RIP correction factor can be applied directly after the RIG value. The RIP normalization process is discussed in more detail below.

In some embodiments, in order to produce a diffuse reverberation tail, a reverberation algorithm may, for instance, include parallel comb filters, followed by a series of all-pass filters. In some embodiments, a digital reverberator may be constructed as a network including one or more delay units interconnected with feedback and/or feedforward paths that may also include signal gain scaling or filter units. The RIP correction factor of a reverberation processing system such as the reverberation processing system 510A of FIG. 5A may depend on one or more parameters such as, for example, reverberator topology, number and durations of delay units included in the network, connection gains, and filter parameters.

Figure 6:
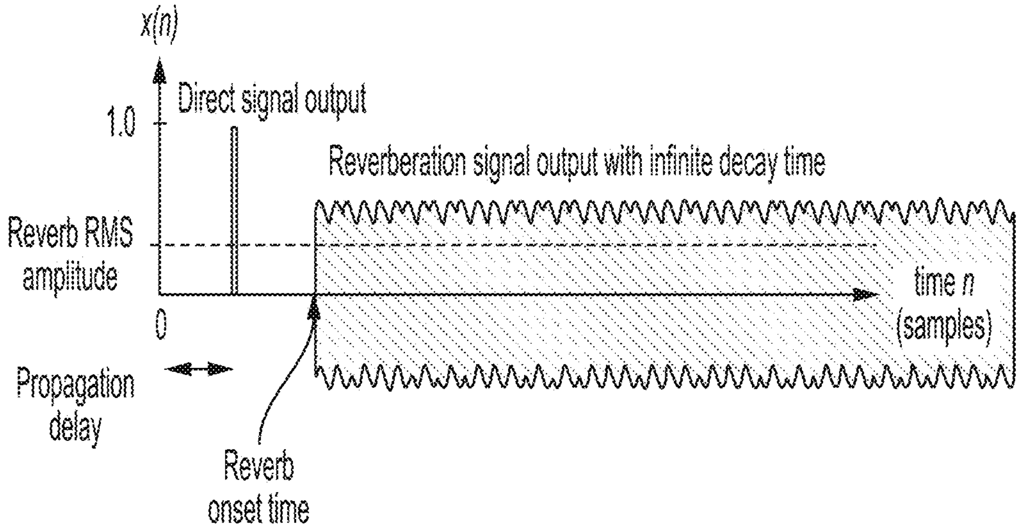
FIG. 6 illustrates a plot of an example reverberation RMS amplitude when the reverberation time is set to infinity, according to some embodiments.

In some embodiments, the RIP correction factor of the reverberation processing system may be equal to a root mean square (RMS) power of an impulse response of the reverberation system when a reverberation time is set to infinity. In some embodiments, for example, as illustrated in FIG. 6, when the reverberation time of a reverberator is set to infinity, the impulse response of the reverberator may be a non-decaying noise-like signal having constant RMS amplitude versus time.

The RMS power $P_{rms}(t)$ of a digital signal {x} at time t, expressed in samples, may be equal to an average of a squared signal amplitude. In some embodiments, the RMS power may be expressed as:

$$P_{rms}(t) = \frac{1}{N}\sum_{n=t}^{t+N-1} x(n)^2 \quad (1)$$

where t is the time, N is the number of consecutive signal samples, and n is the signal sample. The average may be evaluated over a signal window starting at time t and containing N consecutive signal samples.

The RMS amplitude may be equal to the square root of the RMS power $P_{rms}(t)$. In some embodiments, the RMS amplitude may be expressed as:

$$A_{rms}(t)=\sqrt{P_{rms}(t)} \quad (2)$$

Figure 8:
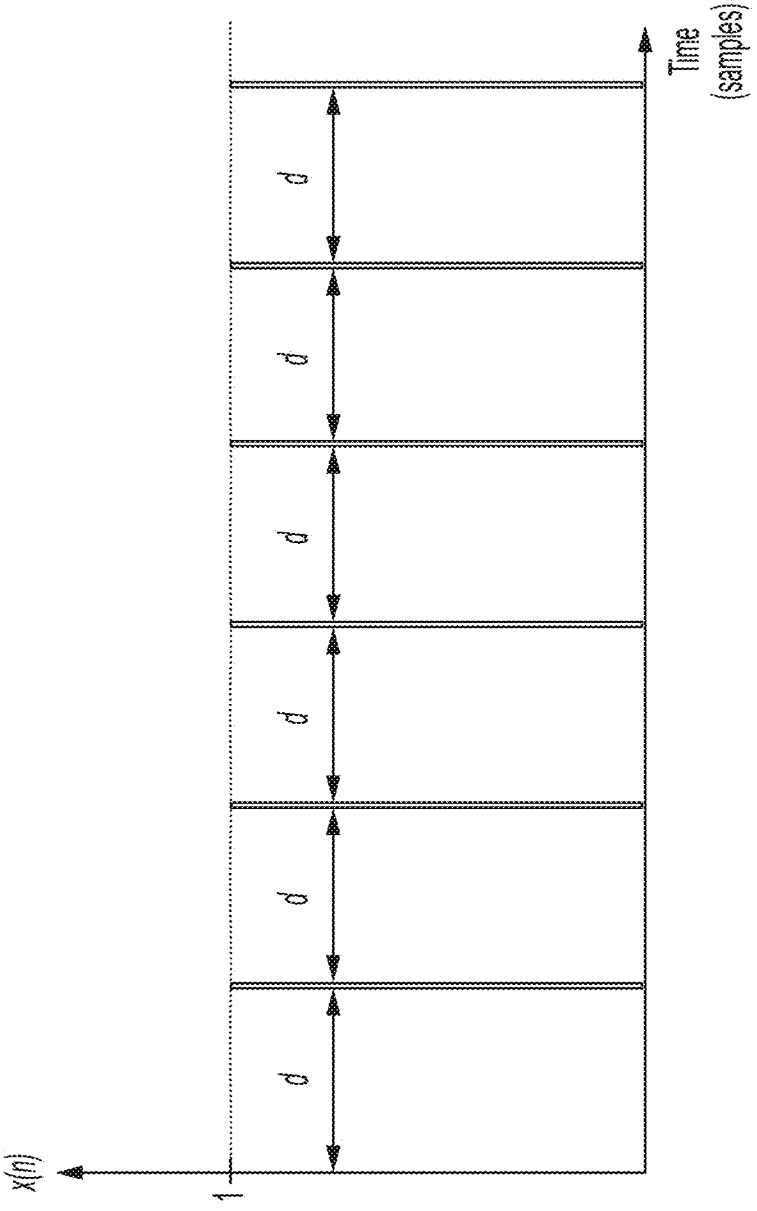
FIG. 8 illustrates an example output signal from the reverberator of FIG. 5, according to some embodiments.

In some embodiments, in the impulse response of the reverberator (e.g., as illustrated in FIG. 6), the RIP correction factor may be derived as an expected RMS power of a constant-power signal that follows reverberation onset, with the reverberation decay time set to infinity. FIG. 8 illustrates an example output signal from running a single impulse of amplitude 1.0 into the audio rendering system 500 of FIG. 5A. In such instance, the reverberation decay time is set to infinity, a direct signal output is set to 1.0, and the direct signal output is delayed by a source-to-listener propagation delay.

Figure 7:
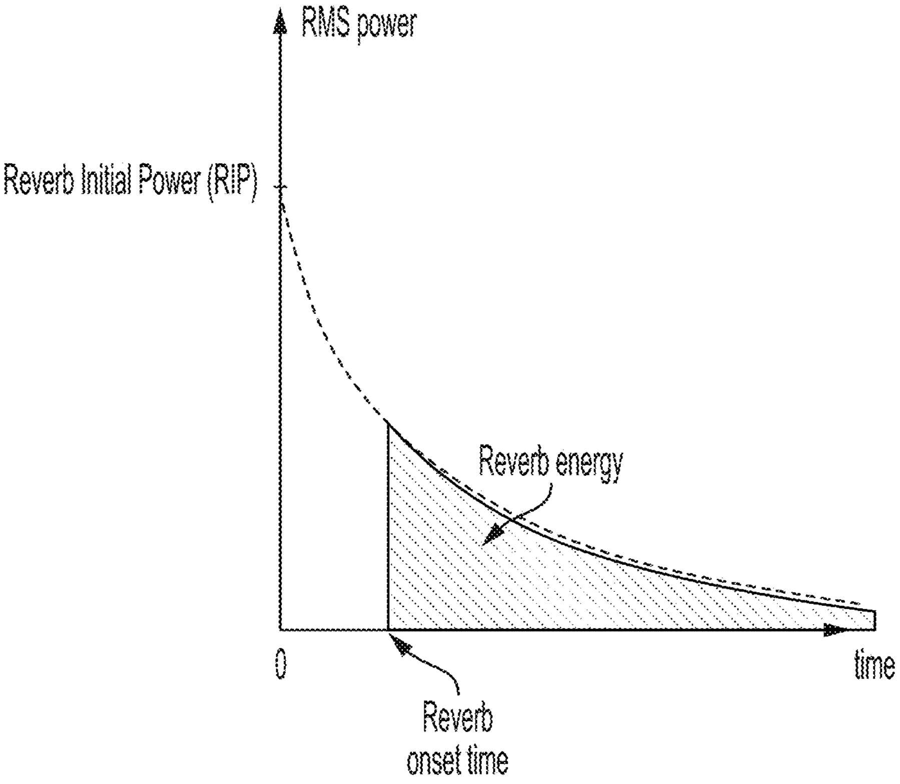
FIG. 7 illustrates a plot of an example RMS power that substantially follows an exponential decay after a reverberation onset time, according to some embodiments.

In some embodiments, the reverberation time of the reverberation processing system 510A may be set to a finite value. With the finite value, the RMS power may substantially follow an exponential decay (after a reverberation onset time), as shown in FIG. 7. The reverberation time (T60) of the reverberation processing system 510A may be defined generally as the duration over which the RMS power (or amplitude) decays by 60 dB. The RIP correction factor may be defined as the power measured on the RMS power decay curve extrapolated to time t=0. Time t=0 can be the time of emission of the input signal 501 (in FIG. 5A).

Example Reverberators

In some embodiments, the reverberator 514 (of FIG. 5A) may be configured to operate a reverberation algorithm, such as the one described in Smith, "J.O. Physical Audio Signal Processing," http://ccrma.stanford.edu/~jos/pasp/, online book, 2010 edition. In these embodiments, the reverberator may contain a comb filter stage. The comb filter stage may include 16 comb filters (e.g., eight comb filters for each ear), where each comb filter can have a different feedback loop delay length.

In some embodiments, the RIP correction factor for the reverberator may be calculated by setting the reverberation time to infinity. Setting the reverberation time to infinity may be equivalent to assuming that the comb filters do not have any built-in attenuation. If a Dirac impulse is input through the comb filters, the output signal of the reverberator 514 may be a sequence of full scale impulses, for example.

FIG. 8 illustrates an example output signal from the reverberator 514 of FIG. 5A, according to some embodiments. The reverberator 514 may include a comb filter (not shown). If there is only one comb filter with a feedback loop delay length d, expressed in samples, then the echo density may be equal to the reciprocal of the feedback loop delay length d. The RMS amplitude may be equal to the square root of the echo density. The RMS amplitude may be expressed as:

$$A_{rms} = \sqrt{\frac{1}{d}} \quad (3)$$

In some embodiments, the reverberator may have a plurality of comb filters, and the RMS amplitude may be expressed as:

$$A_{rms} = \sqrt{\frac{N}{d_{mean}}} \quad (4)$$

where N is the number of comb filters in the reverberator, and $d_{mean}$ is the mean feedback delay length. The mean feedback delay length $d_{mean}$ may be expressed in samples and averaged across the N comb filters.

Figure 9:
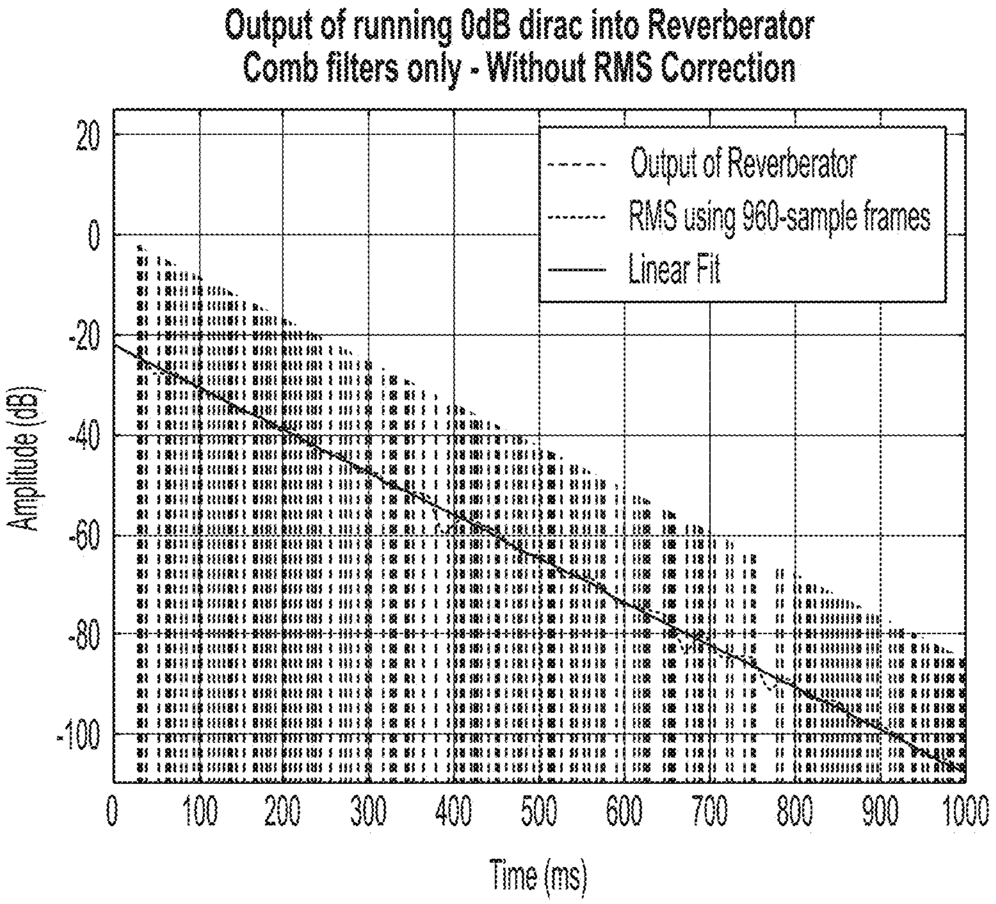
FIG. 9 illustrates an amplitude of an impulse response for an example reverberator including only comb filters, according to some examples.

FIG. 9 illustrates an amplitude of an impulse response for an example reverberator including only comb filters, according to some examples. In some embodiments, the reverberator may have a decay time set to a finite value. As shown in the figure, the RMS amplitude of a reverberator impulse response falls exponentially over time. On a dB scale, the RMS amplitude falls along a straight line and starts from a value equal to the RIP at time t=0. The time t=0 may be the time of emission of a unit impulse at an input (e.g., a time of emission of an impulse by a virtual sound source).

Figure 10:
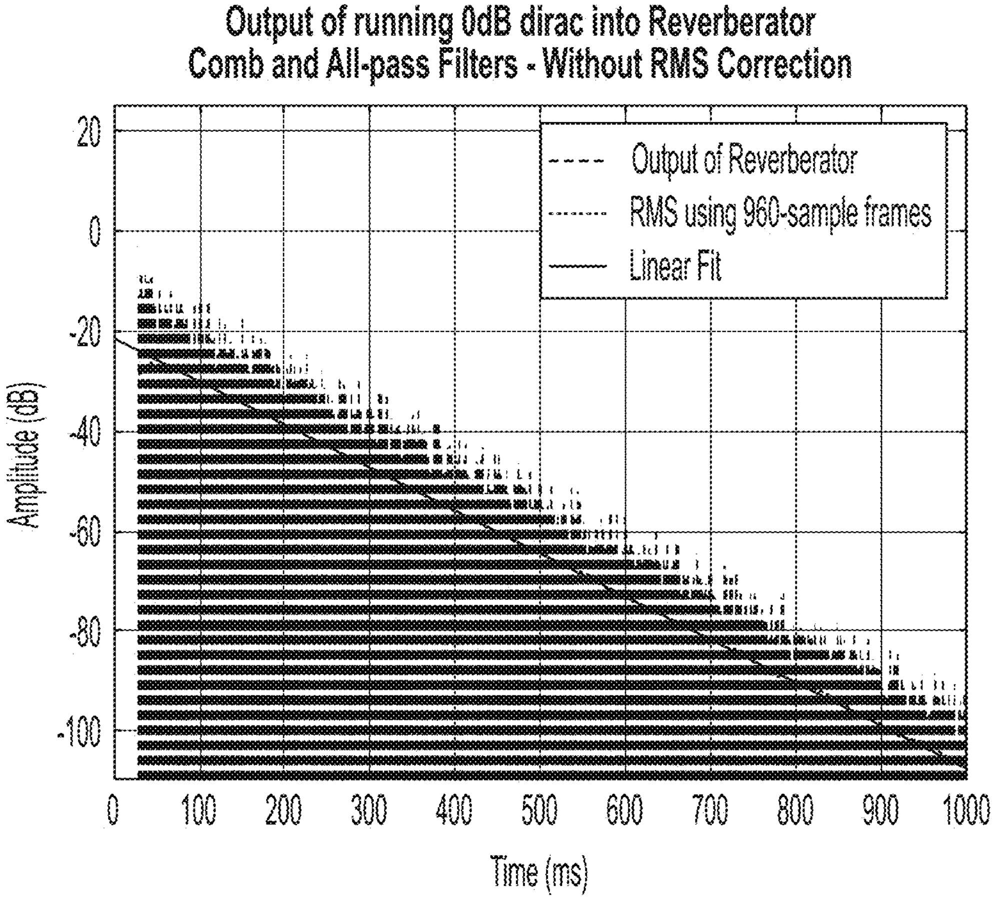
FIG. 10 illustrates an amplitude of an impulse response for an example reverberator including an all-pass filter stage, according to examples of the disclosure.

FIG. 10 illustrates an amplitude of an impulse response for an example reverberator including an all-pass filter stage, according to examples of the disclosure. The reverberator may similar to the one described in Smith, J.O. Physical Audio Signal Processing, http://ccrma.stanford.edu/~jos/pasp/, online book, 2010 edition. Since the inclusion of an all-pass filter may not significantly affect the RMS amplitude of a reverberator impulse response (compared to the RMS amplitude of the reverberator impulse response of FIG. 9), a linear decaying trend of the RMS amplitude in dB may be identical to a trend of FIG. 9. In some embodiments, the linear decaying trend may start from the same RIP value observed at time t=0.

Figure 11A:
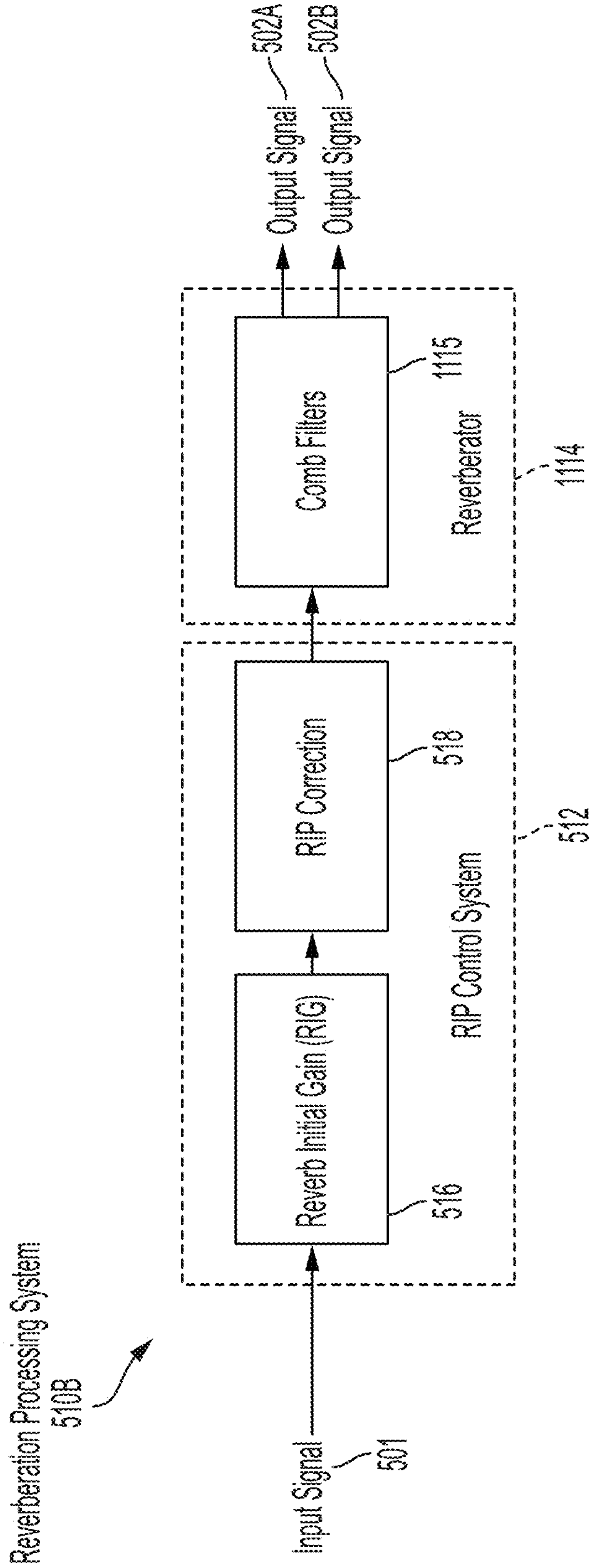
FIG. 11A illustrates an example reverberation processing system having a reverberator including a comb filter, according to some embodiments.
Figure 11B:
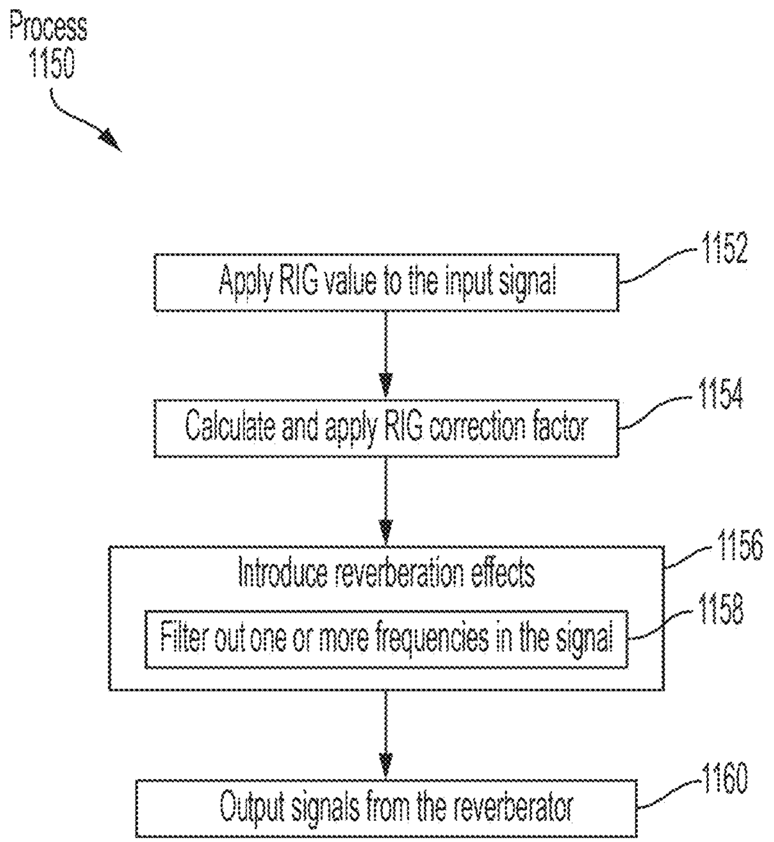
FIG. 11B illustrates a flow of an example process for operating the reverberation processing system of FIG. 11A, according to some embodiments.

FIG. 11A illustrates an example reverberation processing system having a reverberator including a comb filter, according to some embodiments. FIG. 11B illustrates a flow of an example process for operating the reverberation processing system of FIG. 11A, according to some embodiments.

Reverberation processing system 510B can include a RIP control system 512 and a reverberator 1114. The RIP control system 512 can include a RIG 516 and a RIP corrector 518. The RIP control system 512 and the RIP corrector 518 can be correspondingly similar to those included in the reverberation processing system 510A (of FIG. 5A). The reverberation processing system 510B can receive the input signal 501 and output the output signals 502A and 502B. In some embodiments, the reverberation processing system 510B can be included in the audio rendering system 500 of FIG. 5A in lieu of the reverberation processing system 510A (of FIG. 5A).

The RIG 516 may be configured to apply a RIG value (step 1152 of process 1150), and the RIP corrector 518 can apply a RIP correction factor (step 1154), both in series with the reverberator 1114. The serially configuration of the RIG 516, the RIP corrector 518, and the reverberator 114 may cause the RIP of the reverberation processing system 510B to be equal to the RIG.

In some embodiments, the RIP correction factor can be expressed as:

$$RIPcorrection = \sqrt{\frac{d_{mean}}{N}} \quad (5)$$

The application of the RIP correction factor to the signal can cause the RIP to be set to a predetermined value, such as unity (1.0), when the RIG value is set to 1.0.

The reverberator 514 can receive a signal from the RIP control system 512 and can be configured to introduce reverberation effects into the first portion of the input signal (step 1156). The reverberator 514 can include one or more comb filters 1115. The comb filter(s) 1115 can be configured to filter out one or more frequencies in the signal (step 1158). For example, the comb filter(s) 1115 can filter out (e.g., cancel) one or more frequencies to mimic environmental effects (e.g., the walls of the room). The reverberator 1114 can output two or more output signals 502A and 502B (step 1160).

Figure 12A:
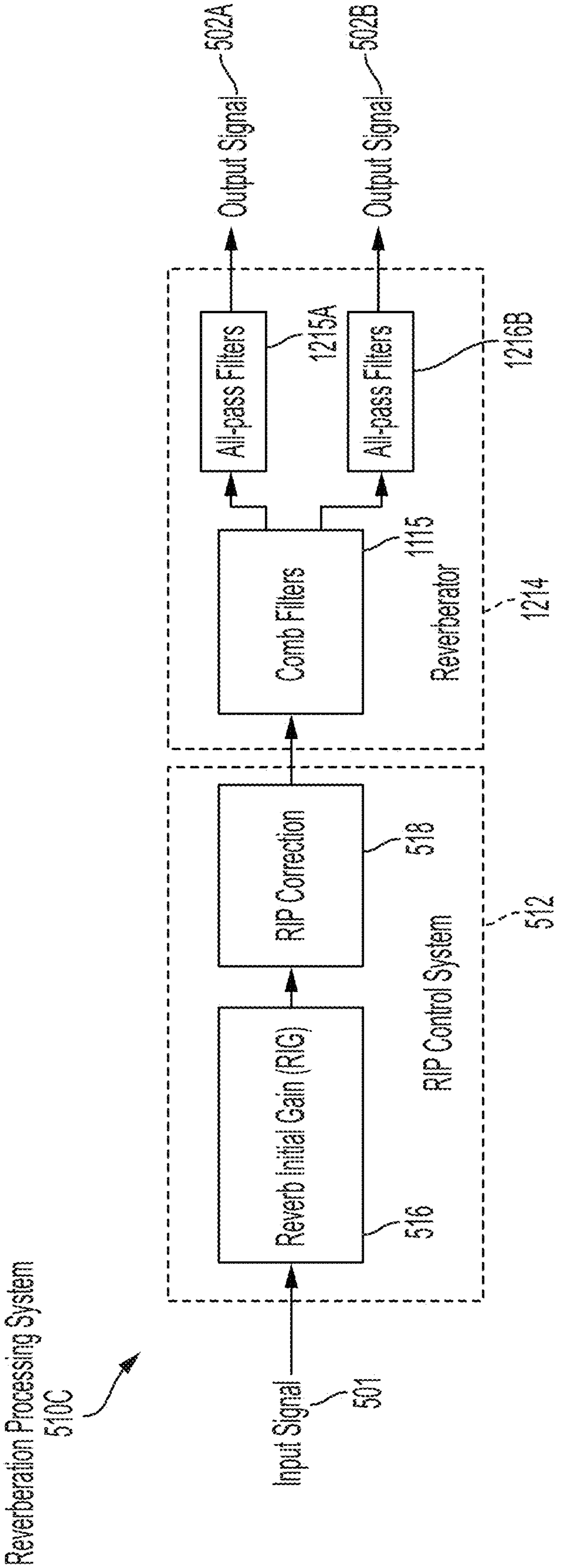
FIG. 12A illustrates an example reverberation processing system having a reverberator including a plurality of all-pass filters.
Figure 12B:
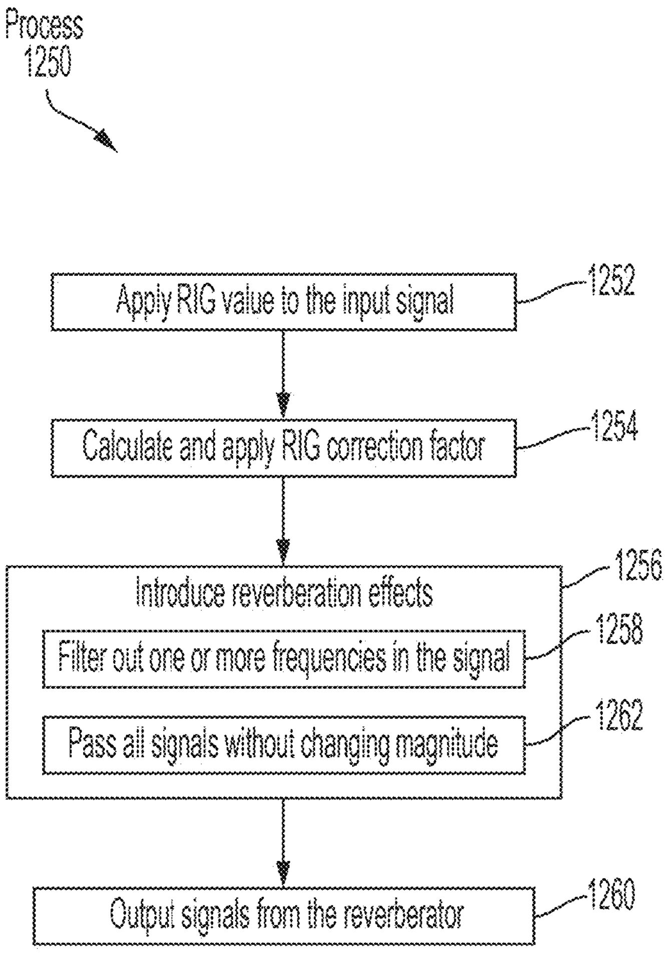
FIG. 12B illustrates a flow of an example process for operating the reverberation processing system of FIG. 12A, according to some embodiments.

FIG. 12A illustrates an example reverberation processing system having a reverberator including a plurality of all-pass filters. FIG. 12B illustrates a flow of an example process for operating the reverberation processing system of FIG. 12A, according to some embodiments.

Reverberation processing system 510C can be similar to the reverberation processing system 510B (of FIG. 11A), but its reverberator 1214 may additionally include a plurality of all-pass filters 1216. Steps 1252, 1254, 1256, 1258, and 1260 may be correspondingly similar to steps 1152, 1154, 1156, 1158, and 1160, respectively.

The reverberation processing system 510C can include a RIP control system 512 and a reverberator 1214. The RIP control system 512 can include a RIG 516 and a RIP corrector 518. The RIP control system 512 and the RIP corrector 518 can be correspondingly similar to those included in the reverberation processing system 510A (of FIG. 5A). The reverberation processing system 510B can receive the input signal 501 and output the output signals 502A and 502B. In some embodiments, the reverberation processing system 510B can be included in the audio rendering system 500 of FIG. 5A in lieu of reverberation processing system 510A (of FIG. 5A) or the reverberation processing system 510B (of FIG. 11).

The reverberator 1214 may additionally include all-pass filters 1215 that can receive signals from the comb filters 1115. Each all-pass filter 1215 can receive a signal from the comb filters 1115 and can be configured to pass its input signal without changing their magnitudes (step 1262). In some embodiments, the all-pass filter 1215 can change a phase of the signal. In some embodiments, each all-pass filter can receive a unique signal from the comb filters. The outputs of the all-pass filters 1215 can be the output signals 502 of the reverberation processing system 510C and the audio rendering system 500. For example, the all-pass filter 1215A can receive a unique signal from the comb filters 1115 and can output the signal 502A; similarly, the all-pass filter 1215B can receive a unique signal from the comb filters 1115 and can output the signal 502B.

Comparing to FIGS. 9 and 10, the inclusion of the all-pass filters 1216 may not significantly affect the output RMS amplitude decay trend.

When applying the RIP correction factor, if the reverberation time is set to infinity, the RIG value is set to 1.0, and a single unit impulse is input through the reverberation processing system 510C, a noise-like output with a constant RMS level of 1 maybe be obtained.

Figure 13:
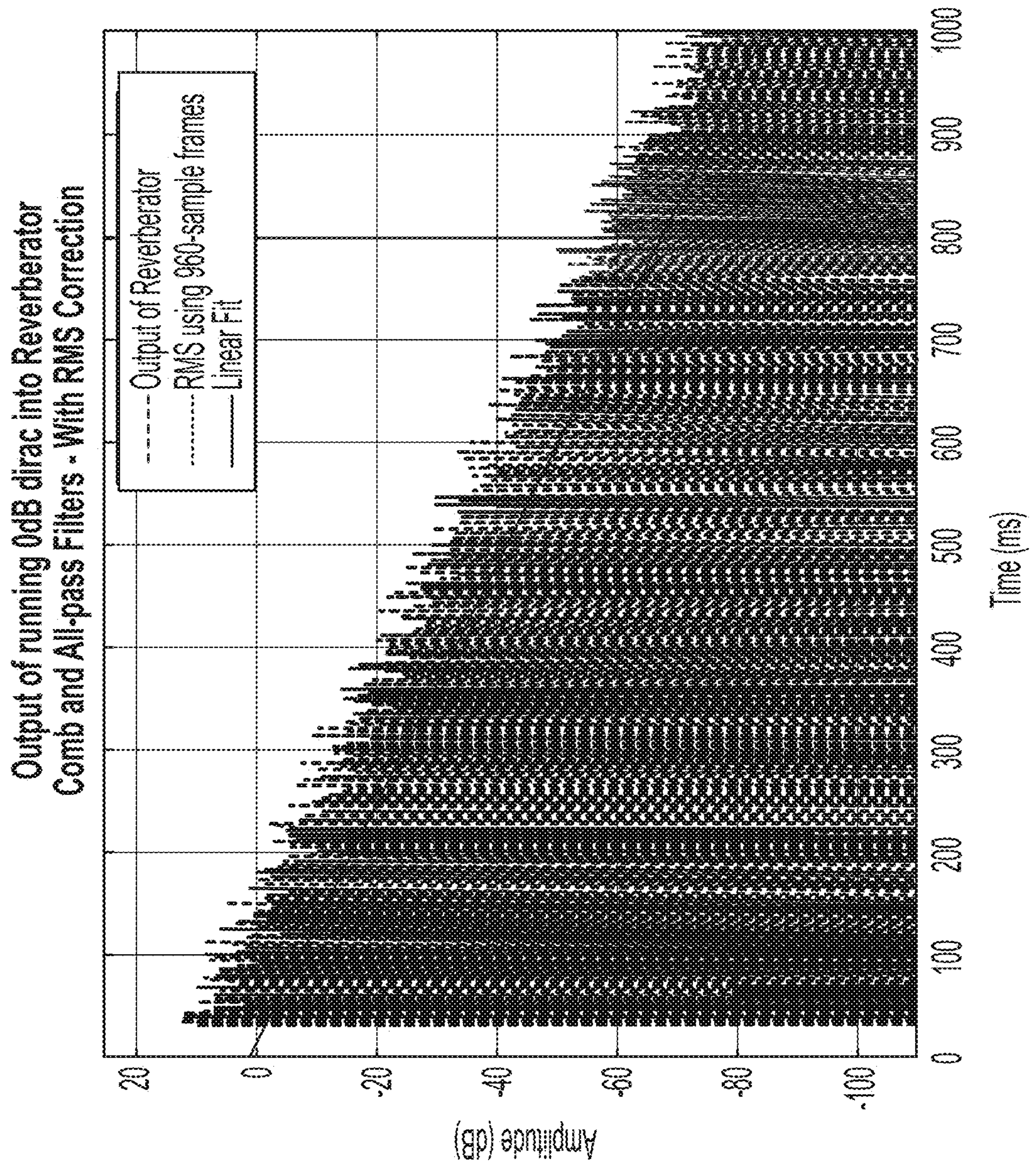
FIG. 13 illustrates an impulse response of the reverberation processing system of FIG. 12, according to some embodiments.

FIG. 13 illustrates an example impulse response of the reverberation processing system 510C of FIG. 12, according to some embodiments. The reverberation time may be set to a finite number, and the RIG may be set to 1.0. On a dB scale, a RMS level may fall along a straight decay line, like as shown in FIG. 10. However, due to the RIP correction factor, the RIP observed in FIG. 13 at the time t=0 may be normalized to 0 dB.

In some embodiments, the RIP normalization method described in connection with FIGS. 5, 6, 7, and 18A may be applied regardless of the particular digital reverberation algorithm implemented in the reverberator 514 of FIG. 5. For example, reverberators may be built from networks of feedback and feedforward delay elements connected with gain matrices.

Figure 14:
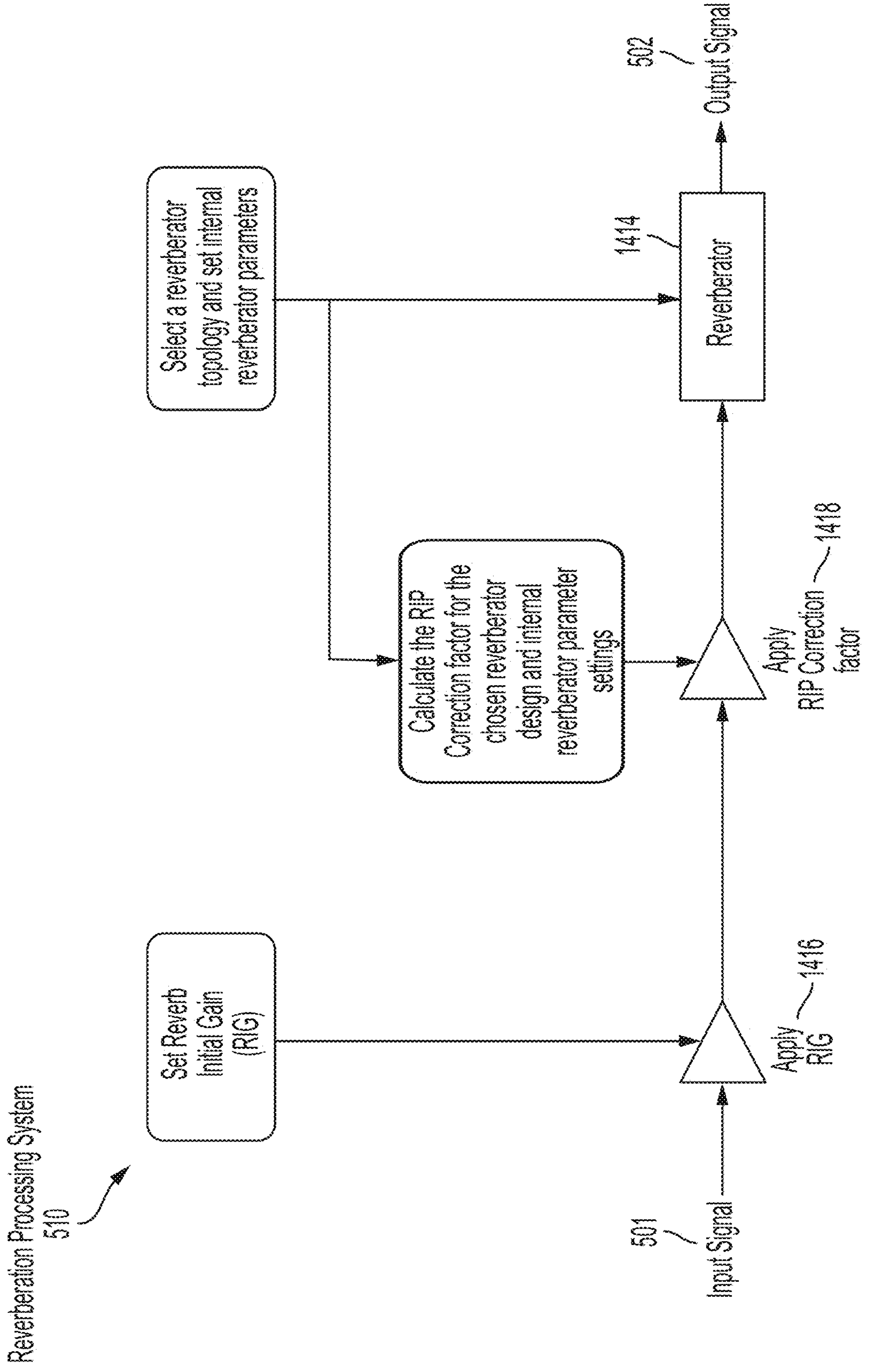
FIG. 14 illustrates a signal input and output through a reverberation processing system 510, according to some embodiments.

FIG. 14 illustrates a signal input and output through a reverberation processing system 510, according to some embodiments. For example, FIG. 14 illustrates a flow of signals of any one of the reverberation processing systems 510 discussed above, such as the ones discussed in FIGS. 5A, 11A, and 12A. The apply RIG step 1416 can include setting the RIG value and applying it to the input signal 501. The apply RIP correction factor step 1418 can include calculating the RIP correction factor for the chosen reverberator design and internal reverberator parameter settings. Additionally, passing the signal through the reverberator 1414 can cause the system to select a reverberator topology and set internal reverberator parameters. As shown in the figure, the output of the reverberator 1414 can be the output signal 502.

Example Feedback Delay Networks

Figure 15A:
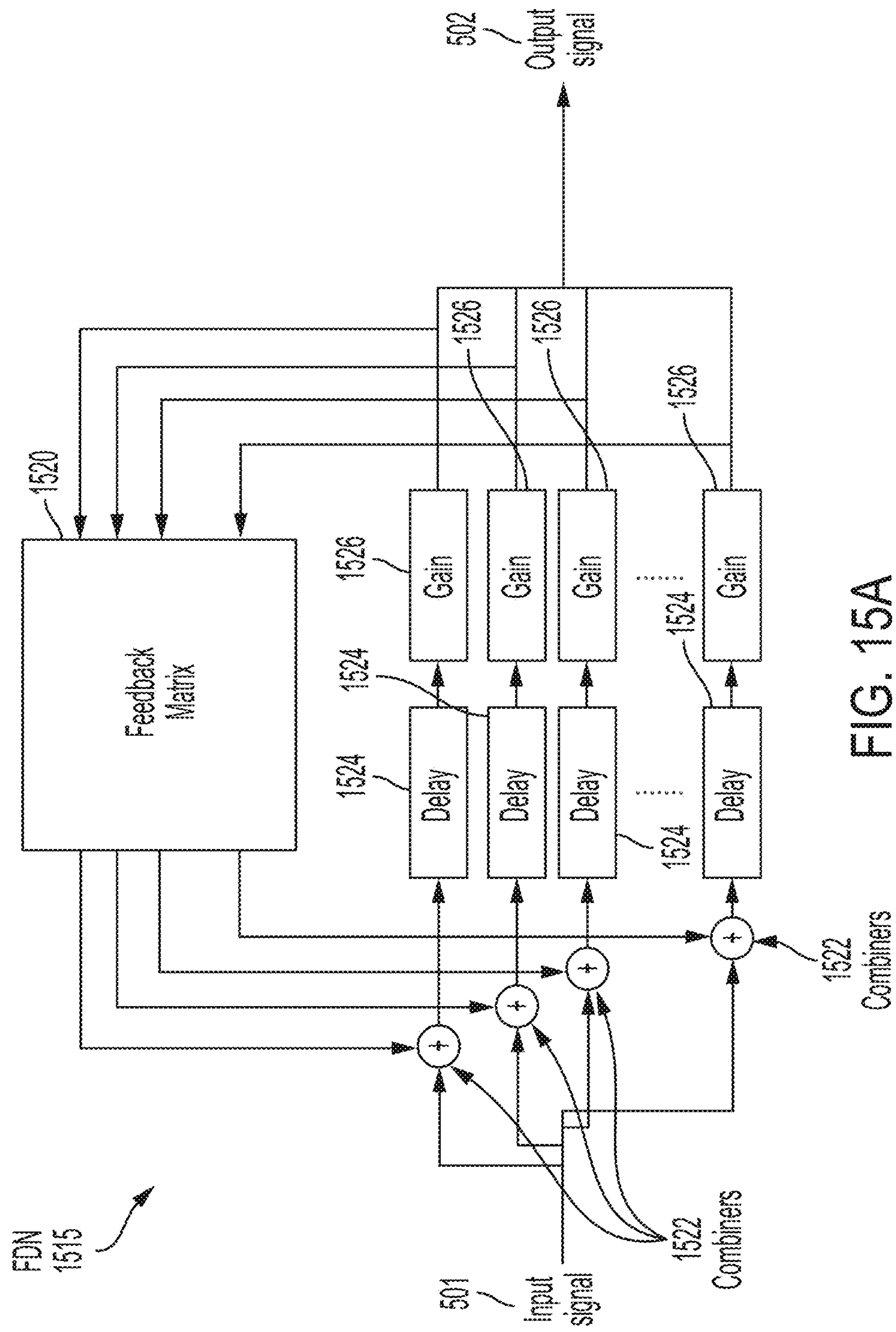
FIG. 15A illustrates a block diagram of an example FDN comprising a feedback matrix, according to some embodiments.

The embodiments disclosed herein may have a reverberator that includes a feedback delay network (FDN), according to some embodiments. The FDN may include an identity matrix, which may allow the output of a delay unit to be fed back to its input. FIG. 15A illustrates a block diagram of an example FDN comprising a feedback matrix, according to some embodiments. FDN 1515 can include a feedback matrix 1520, a plurality of combiners 1522, a plurality of delays 1524, and a plurality of gains 1526.

The combiners 1522 can receive the input signal 1501 and can be configured to combine (e.g., add, aggregate, etc.) its inputs (step 1552 of process 1550). The combiners 1522 can also receive a signal from the feedback matrix 1520. The delays 1524 can receive the combined signals from the combiners 1522 and can be configured to introduce a delay into one or more signals (step 1554). The gains 1526 can receive the signals from the delays 1524 and can be configured to introduce a gain into one or more signals (step 1556). The output signals from the gains 1526 can form the output signal 1502 and may also be input into the feedback matrix 1520. In some embodiments, the feedback matrix 1520 may be a N×N unitary (energy-preserving) matrix.

In the general case where the feedback matrix 1520 is a unitary matrix, the expression of the RIP correction factor may also be given by Equation (5) because the overall energy transfer around the feedback loop of the reverberator remains unchanged and delay-free.

For a given arbitrary choice of reverberator design and internal parameter settings, a RIP correction factor may be calculated, for example. The calculated RIP correction factor may be such that if the RIG value is set to 1.0, then the RIP of the overall reverberation processing system 510 is also 1.0.

Figure 16A:
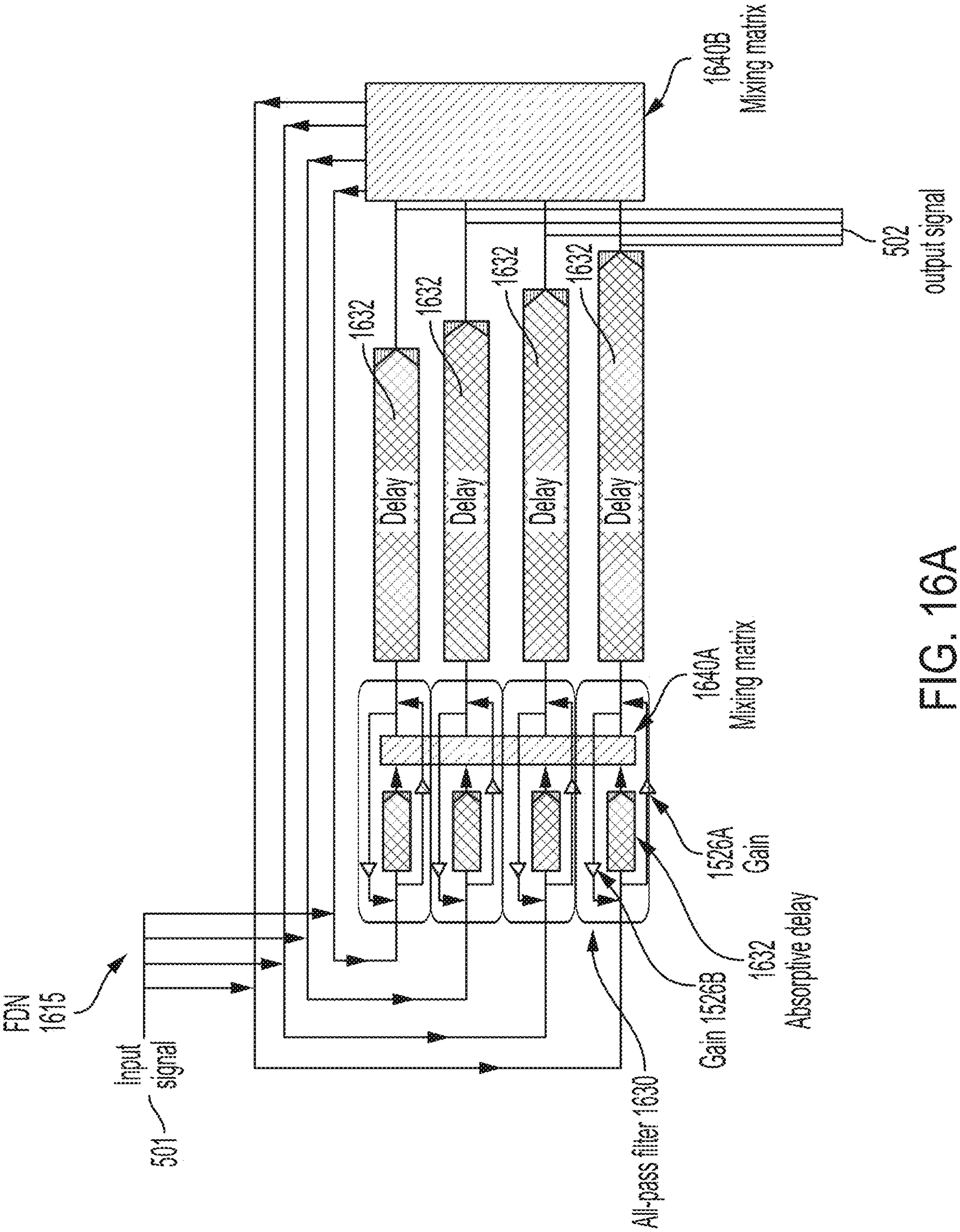
FIG. 16A illustrates a block diagram of an example FDN comprising a plurality of all-pass filters, according to some embodiments.

In some embodiments, the reverberator may include a FDN with one or more all-pass filters. FIG. 16 illustrates a block diagram of an example FDN comprising a plurality of all-pass filters, according to some embodiments.

FDN 1615 can include a plurality of all-pass filters 1630, a plurality of delays 1632, and a mixing matrix 1640B. The all-pass filters 1630 can include a plurality of gains 1526, an absorptive delay 1632, and another mixing matrix 1640A. The FDN 1615 may also include a plurality of combiners (not shown).

The all-pass filters 1630 receive the input signal 1501 and may be configured to pass its input signal without changing its magnitude. In some embodiments, the all-pass filter 1630 can change a phase of the signal. In some embodiments, each all-pass filter 1630 can be configured such that power input to the all-pass filter 1630 can be equal to power output from the all-pass filter. In other words, each all-pass filter 1630 may have no absorption. Specifically, the absorptive delay 1632 can receive the input signal 1501 and can be configured to introduce a delay in the signal. In some embodiments, the absorptive delay 1632 can delay its input signal by a number of samples. In some embodiments, each absorptive delay 1632 can have a level of absorption such that its output signal is a certain level less than its input signal.

The gains 1526A and 1526B can be configured to introduce a gain in its respective input signal. The input signal for the gain 1526A can be the input signal to the absorptive delay, and the output signal for the gain 1526B can be the output signal to the mixing matrix 1640A.

The output signals from the all-pass filters 1630 can be input signals to delays 1632. The delays 1632 can receive signals from the all-pass filters 1630 and can be configured to introduce delays into its respective signals. In some embodiments, the output signals from the delays 1632 can be combined to form the output signal 1502, or, in some embodiments, these signals may be separately taken as multiple output channels in others. In some embodiments, the output signal 1502 may be taken from other points in the network.

The output signals from the delays 1632 can also be input signals into the mixing matrix 1640B. The mixing matrix 1640B can be configured to receive multiple input signals and can output its signals to be fed back into the all-pass filters 1630. In some embodiments, each mixing matrix can be a full mixing matrix.

In these reverberator topologies, the RIP correction factor may be expressed by Equation (5) because the overall energy transfer in and around the feedback loop of the reverberator can remain unchanged and delay-free. In some embodiments, the FDN 1615 may vary the input and/or output signal placement to achieve the desired output signal 1501.

The FDN 1615 with the all-pass filters 1630 can be a reverberating system that takes the input signal 1501 as its input and creates a multi-channel output that can include the correct decaying reverberation signal. The input signal 1501 can be the mono-input signal.

In some embodiments, the RIP correction factor may be expressed as a mathematical function of a set of reverberator parameters {P} that determine the reverberation RMS amplitude $A_{rms}(\{P\})$ when the reverberation time is set to infinity, as shown in FIG. 6. For example, the RIP correction factor can be expressed as:

$$\text{RIPcorrection}=1/A_{rms}(\{P\}) \tag{6}$$

For a given reverberator topology and a given setting of delay unit lengths of the reverberator, the RIP correction factor may be calculated by performing the following steps: (1) setting the reverberation time to infinity; (2) recording the reverberator impulse response (as shown in FIG. 6); (3) measuring the reverberation RMS amplitude $A_{rms}$; and (4) determining the RIP correction factor according to Equation (6).

In some embodiments, the RIP correction factor may be calculated by performing the following steps: (1) setting the reverberation time to any finite value; (2) recording the reverberator impulse response; (3) deriving the reverberation RMS amplitude decay curve $A_{rms}(t)$ (as shown in FIG. 7A or FIG. 7C); (4) determining its value (the RMS amplitude) extrapolated at the time of emission t=0 (denoted as $A_{rms}(0)$ and as shown in FIG. 10); and (5) determining the RIP correction factor according to Equation 7 (below).

$$\text{RIPcorrection}=1/A_{rms}(\{0\}) \tag{7}$$

Example Reverberaton Energy Normalization Method

In some embodiments, it may be desirable to provide a perceptually relevant reverberation gain control method, for example, for application developers, sound engineers, and the like. For example, in some reverberator or room simulator embodiments, it may be desirable to provide programmatic control over a measure of a power amplification factor representative of an effect of a reverberation processing system on the power of an input signal. The power of an input signal may be expressed in dB, for example. The programmatic control over the power amplification factor may allow application developers, sound engineers, and the like, for example, to determine a balance between reverberation output signal loudness and input signal loudness, or direct sound output signal loudness.

Figure 17A:
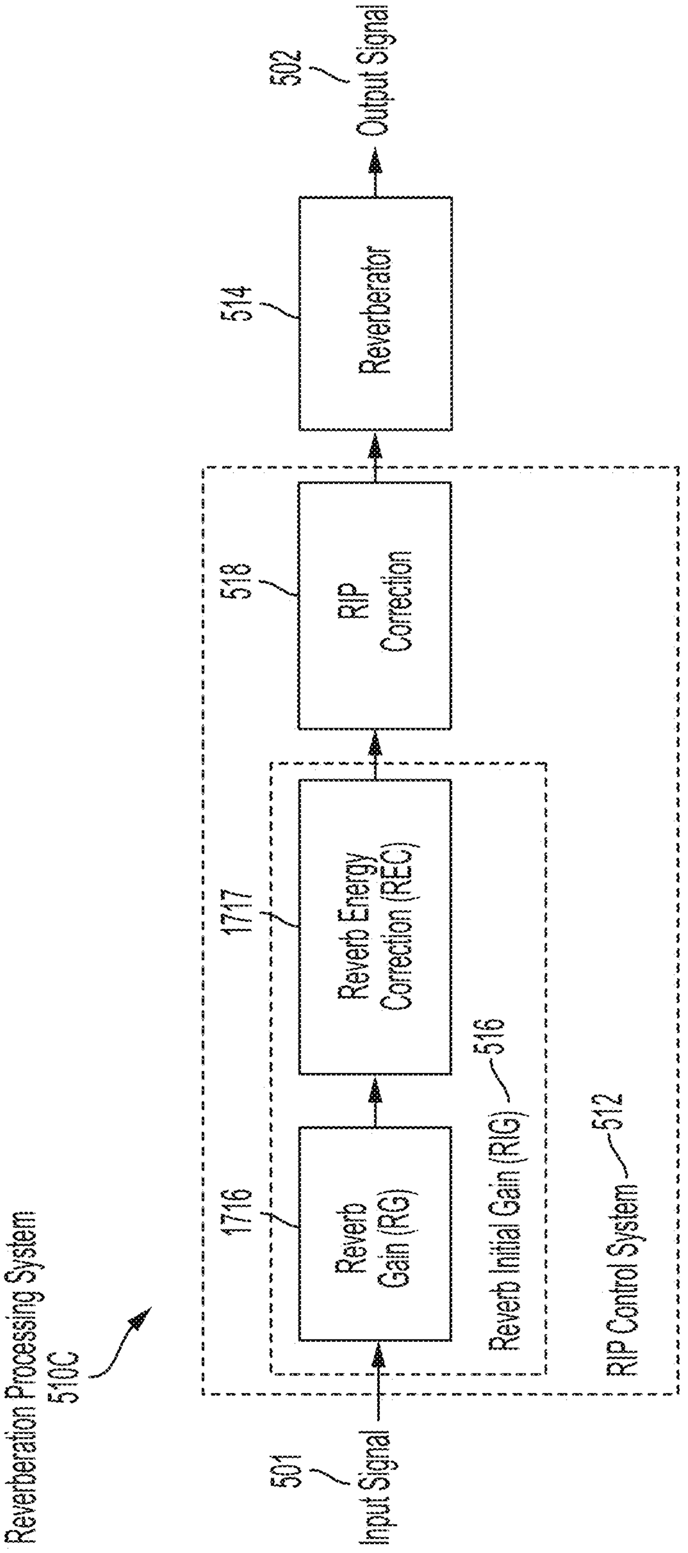
FIG. 17A illustrates a block diagram of an example reverberation processing system including a REC, according to some embodiments.
Figure 17B:
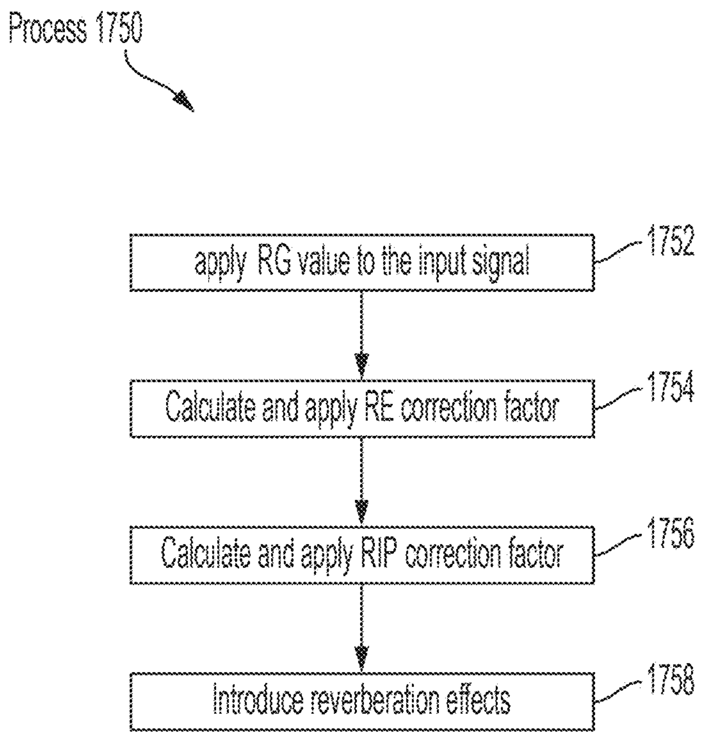
FIG. 17B illustrates a flow of an example process for operating the reverberation processing system of FIG. 17A, according to some embodiments.

In some embodiments, the system can apply a reverberation energy (RE) correction factor. FIG. 17A illustrates a block diagram of an example reverberation processing system including a RE corrector, according to some embodiments. FIG. 17B illustrates a flow of an example process for operating the reverberation processing system of FIG. 17A, according to some embodiments.

Reverberation processing system 510D can include a RIP control system 512 and a reverberator 514. The RIP control system 512 can include a RIG 516 and a RIP corrector 518. The RIP control system 512, the reverberator 514, and the RIP corrector 518 can be correspondingly similar to those included in the reverberation processing system 510A (of FIG. 5A). The reverberation processing system 510D can receive the input signal 501 and can output the output signal 502. In some embodiments, the reverberation processing system 510D can be included in the audio rendering system 500 of FIG. 5A in lieu of reverberation processing system 510A (of FIG. 5A), the reverberation processing system 510B (of FIG. 11A), or the reverberation processing system 510C (of FIG. 12A).

The reverberation processing system 510D may also include a RIG 516 that comprises a reverb gain (RG) 1716 and a RE corrector 1717. The RG 1716 can receive the input signal 501 and can output a signal to the RE corrector 1717.

The RG 1716 can be configured to apply a RG value to the first portion of the input signal 501 (step 1752 of process 1750). In some embodiments, the RIG can be realized by cascading the RG 1716 with the RE corrector 1717, such that the RE correction factor is applied to the first portion of the input signal after the RG value is applied. In some embodiments, the RIG 516 can be cascaded with the RIP corrector 518, forming the RIP control system 512 that is cascaded with the reverberator 514.

The RE corrector 1717 can receive a signal from the RG 1716 and can be configured to calculate and apply a RE correction factor to its input signal (from RG 1716) (step 1754). In some embodiments, the RE correction factor may be calculated such that it represents the total energy in a reverberator impulse response when: (1) a RIP is set to 1.0, and (2) a reverberation onset time is set equal to the time of emission of a unit impulse by a sound source. Both the RG 1716 and the REC 1717 can apply (and/or calculate) the RG value and the REC correction factor, respectively, such that when applied in series, the signal output from the RE corrector 1717 can be normalized to a predetermined value (e.g., unity (1.0)). The RIP of an output signal can be controlled by applying a reverberator gain in series with the reverberator, the reverberator energy corrector factor, and the reverberator initial power factor, as shown in FIG. 17A. The RE normalization process is discussed in more detail below.

The RIP corrector 518 can receive a signal from the RIG 516 and can be configured to calculate and apply a RIP correction factor to its input signal (from the RIG 516) (step 1756). The reverberator 514 can receive a signal from the RIP corrector 518 and can be configured to introduce reverberation effects in the signal (step 1758).

In some embodiments, the RIP of a virtual room may be controlled using the reverberation processing system 510A of FIG. 5A (included in the audio rendering system 500), the reverberation processing system 510B of FIG. 11A (included in the audio rendering system 500), or both. The RIG 516 of the reverberation processing system 510A (of FIG. 5A) may specify the RIP directly, and may be interpreted physically as proportional to a reciprocal of a square root of a cubic volume of the virtual room, for example, as shown in "Analysis and synthesis of room reverberation based on a statistical time-frequency model" by Jean-Marc Jot, Laurent Cerveau, and Olivier Warusfel.

The RG 516 of the reverberation processing system 510D (of FIG. 17A) may control the RIP of the virtual room indirectly by specifying the RE. The RE may be a perceptually relevant quantity that is proportional to an expected energy of reverberation that a user will receive from a virtual sound source if it is collocated at the same position as a virtual listener in the virtual room. One example virtual sound source that is collocated at the same position as the virtual listener is a virtual listener's own voice or footsteps.

In some embodiments, the RE can be calculated and used to represent the amplification of an input signal by a reverberation processing system. The amplification may be expressed in terms of signal power. As shown in FIG. 7, the RE can be equal to the area under a reverb RMS power envelope integrated from a reverb onset time. In some embodiments, in an interactive audio engine for video games or virtual reality, the reverb onset time may be at least equal to a propagation delay for a given virtual sound source. Therefore, the calculation of the RE for a given virtual sound source may depend on the position of the virtual sound source.

Figure 18A:
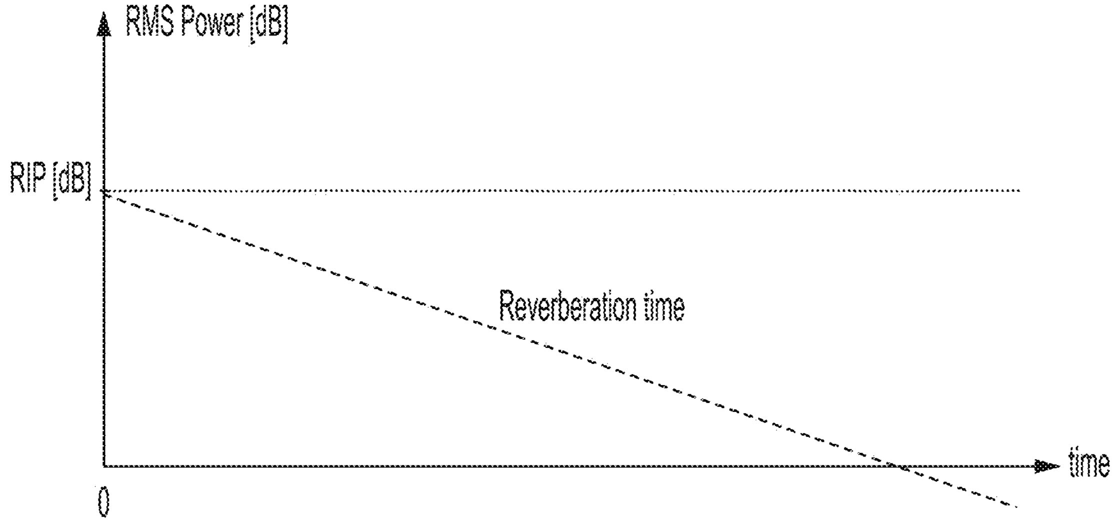
FIG. 18A illustrates an example calculated RE overtime for a virtual sound source collocated with a virtual listener, according to some embodiments.

FIG. 18A illustrates the calculated RE overtime for a virtual sound source collocated with a virtual listener, according to some embodiments. In some embodiments, it can be assumed that a reverberation onset time is equal to a time of sound emission. In this case, the RE can represent the total energy in a reverberator impulse response when a reverberation onset time is assumed to be equal to the time of emission of a unit impulse by a sound source. The RE can be equal to the area under a reverb RMS power envelop integrated from a reverb onset time.

In some embodiments, the RMS power curve may be expressed as a continuous function of time t. In such instance, the RE may be expressed as:

$$RE = \int_{t=0}^{\infty} P_{rms}(t) \cdot dt \tag{8}$$

In some embodiment, such as discrete-time embodiments of a reverberation processing system, the RMS power curve can be expressed as a function of the discrete time t=n $F_s$. In such instance, the RE may be expressed as:

$$RE = \sum_{n=0}^{\infty} P_{rms}\left(\frac{n}{Fs}\right) \tag{9}$$

where $F_S$ is the same rate.

In some embodiments, a RE correction factor may be calculated and applied in series with the RIP correction factor and the reverberator, so that the RE may be normalized to a predetermined value (e.g., unity (1.0)). The REC may be set equal to the reciprocal of the square root of RE, as follows:

$$REC = \frac{1}{\sqrt{RE}} \tag{10}$$

In some embodiments, a RIP of an output reverberation signal may be controlled by applying a RG value in series with a RE correction factor, a RIP correction factor, and a reverberator, such as shown in the reverberation processing system 510C of FIG. 17A. The RG value and RE correction may be combined to determine the RIG, as follows:

$$RIG = RG * REC \tag{11}$$

Therefore, the RE correction factor (REC) may be used to control the RIP correction factor in terms of the signal-domain RG quantity, instead of the RIG.

Figure 18B:
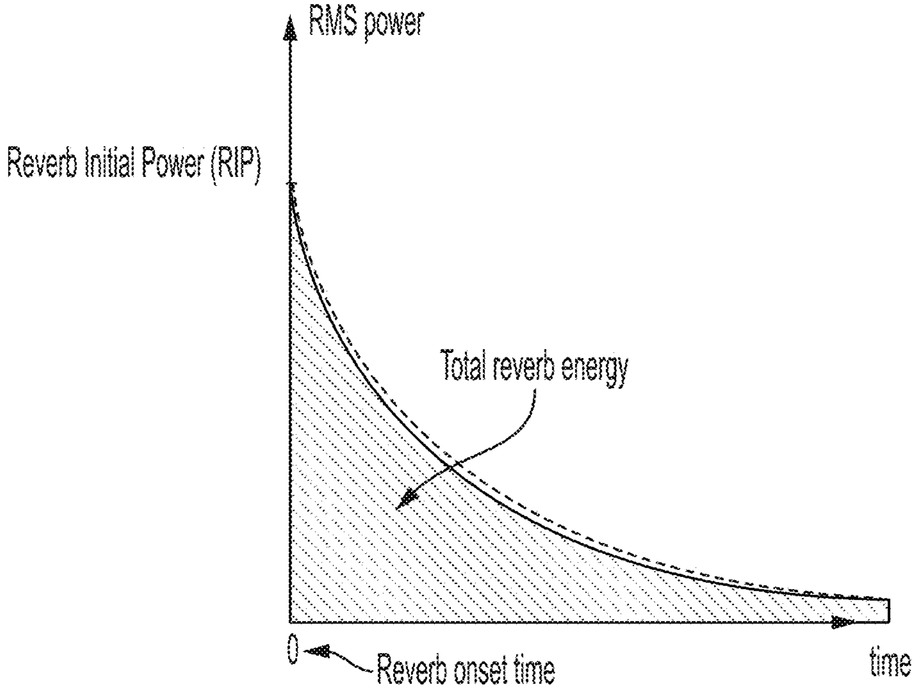
FIG. 18B illustrates an example calculated RE with instant reverberation onset, according to some embodiments.

In some embodiments, the RIP may be mapped to a signal power amplification measured derived by integrated RE in the system impulse response. As shown above in Equations (10)-(11), this mapping allows the control of the RIP via the familiar notion of a signal amplification factor, namely, the RG. In some embodiments, the advantage of assuming instant reverberation onset for the RE calculation, as shown in FIG. 18B and Equations (8)-(9), can be that this mapping may be expressed without requiring that the user or listener position be taken into account.

In some embodiments, the reverb RMS power curve of an impulse response of the reverberator 514 can be expressed as a decaying function of time. The decaying function of time can start at time t=0.

$$P_{rms}(t) = RIP * e^{-\alpha t} \tag{12}$$

In some embodiments, the decay parameter can be expressed as a function of decay time T60, as follows:

$$\alpha=3*\log(7.0)/T60 \quad (13)$$

The total RE may be expressed as:

$$RE = RIP\Big/\left(10^{\frac{6}{T60*Fs}}-1\right) \quad (14)$$

In some embodiments, the RIP may be normalized to a predetermined value (e.g., unity (1.0)), and the REC may be expressed as follows:

$$REC = \sqrt{10^{\frac{6}{T60*Fs}}-1} \quad (15)$$

In some embodiments, the REC may be approximated according to the following equation:

$$REC \approx \sqrt{\frac{6*\log(10)}{T60*Fs}} \quad (16)$$

Figure 19:
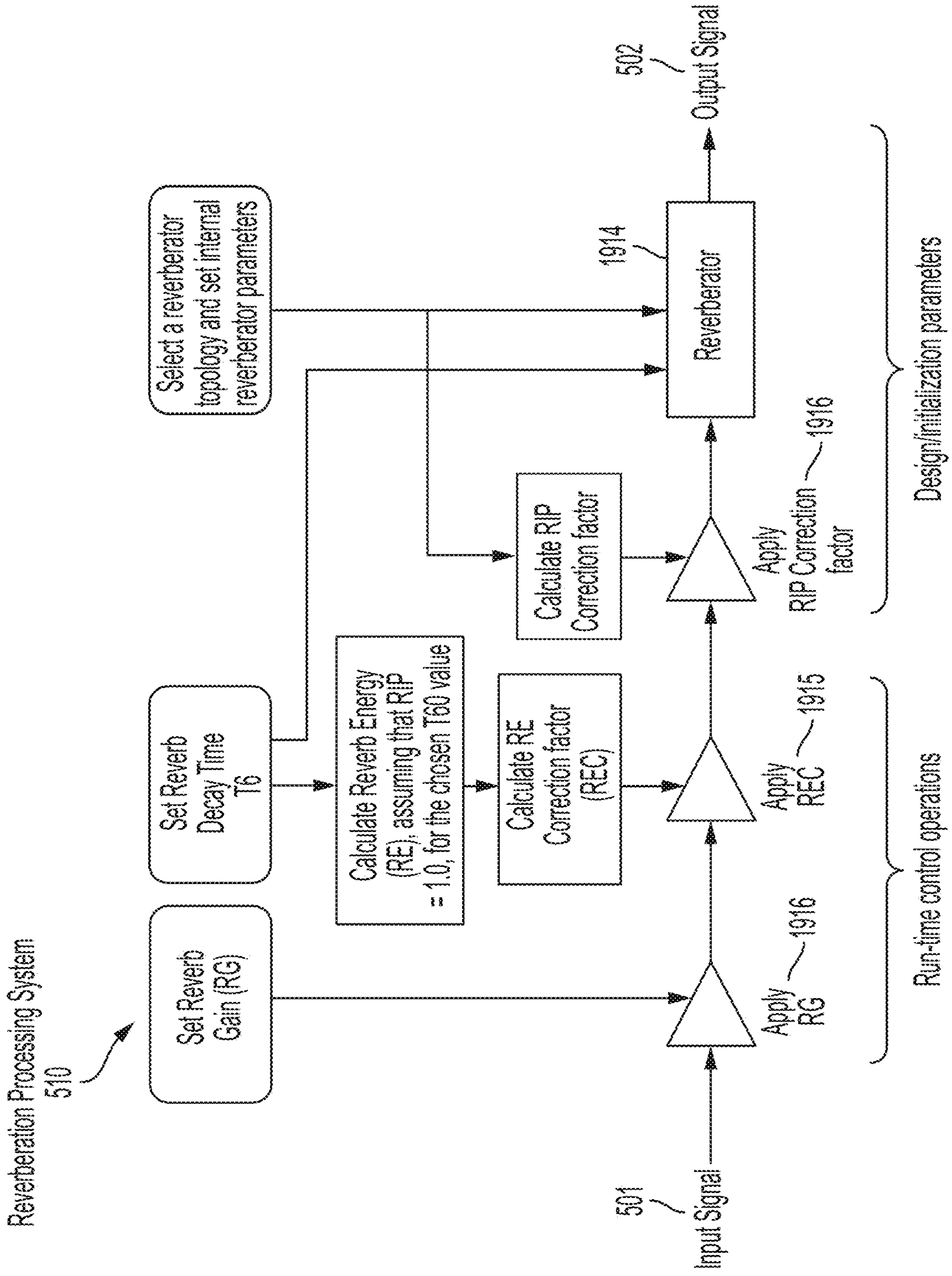
FIG. 19 illustrates a flow of an example reverberation processing system, according to some embodiments.

FIG. 19 illustrates a flow of an example reverberation processing system, according to some embodiments. For example, FIG. 19 can illustrate the flow of the reverberation processing system 510D of FIG. 17A. For a given arbitrary choice of reverberator design and internal parameter settings, a RIP correction factor can be calculated by applying Equations (5)-(7), for example. In some embodiments, for a given run-time adjustment of the reverberation decay time T60, the total RE may be re-calculated by applying Equations (8)-(9), where it can be assumed that the RIP is normalized to 1.0. The REC factor can be derived according to Equation (10).

Due to the application of the REC factor, adjusting the RG value or the reverberation decay time T60 at runtime may have an effect of automatically correcting the RIP of the reverberation processing system such that the RG can operate as an amplification factor for the RMS amplitude of an output signal (e.g., output signal 502) relative to the RMS amplitude of an input signal (e.g., input signal 501). It should be noted that adjusting the reverberation decay time T60 may not require recalculating the RIP correction factor because, in some embodiments, the RIP may not be affected by a modification of the decay time.

In some embodiments, the REC may be defined based on measuring the RE as the energy in the reverberation tail between two points specified in time from a sound source emission, after having set the RIP to 1.0 by applying the RIP correction factor. This may be beneficial, for example, when using convolution with a measured reverberation tail.

In some embodiments, the RE correction factor may be defined based on measuring the RE as the energy in the reverberation tail between two points defined using energy thresholds, after having set the RIP to 1.0 by applying the RIP correction factor. In some embodiments, energy thresholds relative to the direct sound, or absolute energy thresholds, may be used.

In some embodiments, the RE correction factor may be defined based on measuring the RE as the energy in the reverberation tail between one point defined in time and one point defined using an energy threshold, after having set the RIP to 1.0 by applying the RIP correction factor.

In some embodiments, the RE correction factor may be computed by considering a weighted sum of the energy contributed by the different coupled spaces, after having set the RIP of each of the reverberation tails to 1.0 by applying the RIP correction factor to each reverb. One exemplary application of this RE correction factor computation may be where an acoustical environment includes two or more coupled spaces.

With respect to the systems and methods described above, elements of the systems and methods can be implemented by one or more computer processors (e.g., CPUs or DSPs) as appropriate. The disclosure is not limited to any particular configuration of computer hardware, including computer processors, used to implement these elements. In some cases, multiple computer systems can be employed to implement the systems and methods described above. For example, a first computer processor (e.g., a processor of a wearable device coupled to a microphone) can be utilized to receive input microphone signals, and perform initial processing of those signals (e.g., signal conditioning and/or segmentation, such as described above). A second (and perhaps more computationally powerful) processor can then be utilized to perform more computationally intensive processing, such as determining probability values associated with speech segments of those signals. Another computer device, such as a cloud server, can host a speech recognition engine, to which input signals are ultimately provided. Other suitable configurations will be apparent and are within the scope of the disclosure.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

The invention claimed is:

1. A method for rendering an audio signal, the method comprising:

receiving an input signal, the input signal including a first portion and a second portion;

using a reverberation processing system to:

apply a reverb initial gain (RIG) value to the first portion of the input signal, apply a reverb initial power (RIP) correction factor to the first portion of the input signal, wherein the RIP correction factor is applied after the RIG value is applied, and introduce reverberation effects in the first portion of the input signal, wherein the reverberation effects are applied separately from the RIG value and the RIP correction factor;

using a direct processing system to:

introduce a delay into the second portion of the input signal, and apply a gain to the second portion of the input signal;

combining the first portion of the input signal from the reverberation processing system and the second portion of the input signal from the direct processing system; and outputting the combined first and second portions of the input signal as an output signal, wherein the output signal is the audio signal.

2. The method of claim 1, further comprising:
calculating the RIP correction factor, wherein the RIP correction factor is calculated and applied to the first portion of the input signal by a RIP corrector,
wherein the RIP correction factor is calculated such that a signal output from the RIP corrector is normalized to 1.0.

3. The method of claim 1, wherein the RIP correction factor depends on one or more of: a reverberator topology, a number and durations of delay units, connection gains, and filter parameters.

4. The method of claim 1, wherein the RIP correction factor is equal to a RMS power of a reverberation impulse response.

5. The method of claim 1, wherein the introduction of the reverberation effects in the first portion of the input signal includes filtering out one or more frequencies.

6. The method of claim 1, wherein the introduction of the reverberation effects includes changing a phase of the first portion of the input signal.

7. The method of claim 1, wherein the introduction of the reverberation effects includes selecting a reverberator topology and setting internal reverberator parameters.

8. The method of claim 1, wherein the RIG value is equal to 1.0, the method further comprising:
calculating the RIP correction factor such that a RIP of the reverberation processing system is equal to 1.0.

9. The method of claim 1, further comprising:
calculating the RIP correction factor by:
setting a reverberation time to infinity,
recording a reverberator impulse response, and
measuring a reverberation RMS amplitude,
wherein the RIP correction factor is related to an inverse of the reverberation RMS amplitude.

10. The method of claim 1, further comprising:
calculating the RIP correction factor by:
setting a reverberation time to a finite value,
recording a reverberator impulse response,
deriving a reverberation RMS amplitude decay curve, and
determining the RMS amplitude at a time of emission,
wherein the RIP correction factor is related to an inverse of the reverberation RMS amplitude.

11. The method of claim 1, wherein the application of the RIG value includes:
applying a reverb gain (RG) value to the first portion of the input signal, and
applying a reverb energy (RE) correction factor to the first portion of the input signal, wherein the RE correction factor is applied after the RG value is applied.

12. The method of claim 11, further comprising:
calculating the RE correction factor, wherein the RE correction factor is calculated and applied to the first portion of the input signal by a RE corrector,
wherein the RE corrector is calculated such that a signal output from the RE correct is normalized to 1.0.

13. The method of claim 11, further comprising:
calculating the RIG value, wherein the RIG value is equal to the RG value multiplied by the RE correction factor.

14. The method of claim 1, wherein the reverberation effects are introduced after the RIP correction factor is applied.

15. A system comprising:
a wearable head device configured to provide an audio signal to a user; and
circuitry configured to render the audio signal, wherein the circuitry includes:
a reverberation processing system including:
a reverb initial gain (RIG) configured to apply a RIG value to a first portion of an input signal,
a reverb initial power (RIP) corrector configured to apply a RIP correction factor to a signal from the RIG, and
a reverberator configured to introduce reverberation effects in a signal from the RIP corrector, wherein the reverberation effects are applied separately from the RIG value and the RIP correction factor;
a direct processing system including:
a propagation delay configured to introduce a delay in a second portion of the input signal, and
a direct gain configured to apply a gain to the second portion of the input signal; and
a combiner configured to:
combine the first portion of the input signal from the reverberation processing system and the second portion of the input signal from the direct processing system, and
output the combined first and second portions of the input signal as an output signal, wherein the output signal is the audio signal.

16. The system of claim 15, wherein the reverberator includes a plurality of comb filters configured to filter out one or more frequencies in the signal from the RIP corrector.

17. The system of claim 16, wherein the reverberator includes a plurality of all-pass filters configured to change a phase of signals from the plurality of comb filters.

18. The system of claim 15, wherein the RIG includes a reverb gain (RG) configured to apply a RG value to the first portion of the input signal.

19. The system of claim 18, wherein the RIG further includes a reverb energy (RE) corrector configured to apply a RE correction factor to a signal from the RG.

20. A method for rendering an audio signal, the method comprising:
receiving an input signal, the input signal including a first portion and a second portion;
calculating a reverb initial power (RIP) correction factor by:
setting a reverberation time to infinity,
recording a reverberator impulse response, and
measuring a reverberation RMS amplitude,
wherein the RIP correction factor is related to an inverse of the reverberation RMS amplitude;
using a reverberation processing system to:
apply a reverb initial gain (RIG) value to the first portion of the input signal,
apply the RIP correction factor to the first portion of the input signal, wherein the RIP correction factor is applied after the RIG value is applied, and
introduce reverberation effects in the first portion of the input signal;
using a direct processing system to:
introduce a delay into the second portion of the input signal, and
apply a gain to the second portion of the input signal;
combining the first portion of the input signal from the reverberation processing system and the second portion of the input signal from the direct processing system; and
outputting the combined first and second portions of the input signal as an output signal, wherein the output signal is the audio signal.

21. A method for rendering an audio signal, the method comprising:

receiving an input signal, the input signal including a first portion and a second portion;

calculating a reverb initial power (RIP) correction factor by:

setting a reverberation time to a finite value, recording a reverberator impulse response, deriving a reverberation RMS amplitude decay curve, and determining the RMS amplitude at a time of emission, wherein the RIP correction factor is related to an inverse of the reverberation RMS amplitude;

using a reverberation processing system to:

apply a reverb initial gain (RIG) value to the first portion of the input signal, apply the RIP correction factor to the first portion of the input signal, wherein the RIP correction factor is applied after the RIG value is applied, and introduce reverberation effects in the first portion of the input signal;

using a direct processing system to:

introduce a delay into the second portion of the input signal, and apply a gain to the second portion of the input signal;

combining the first portion of the input signal from the reverberation processing system and the second portion of the input signal from the direct processing system; and outputting the combined first and second portions of the input signal as an output signal, wherein the output signal is the audio signal.

22. A method for rendering an audio signal, the method comprising:

receiving an input signal, the input signal including a first portion and a second portion;

using a reverberation processing system to:

apply a reverb initial gain (RIG) value to the first portion of the input signal, apply a reverb initial power (RIP) correction factor to the first portion of the input signal, wherein the RIP correction factor is applied after the RIG value is applied, and wherein the application of the RIG value includes:

applying a reverb gain (RG) value to the first portion of the input signal, and applying a reverb energy (RE) correction factor to the first portion of the input signal, wherein the RE correction factor is applied after the RG value is applied;

introduce reverberation effects in the first portion of the input signal; and using a direct processing system to:

introduce a delay into the second portion of the input signal, and apply a gain to the second portion of the input signal;

combining the first portion of the input signal from the reverberation processing system and the second portion of the input signal from the direct processing system; and outputting the combined first and second portions of the input signal as an output signal, wherein the output signal is the audio signal.

* * * * *